(12) United States Patent
Marino et al.

(10) Patent No.: US 12,228,896 B2
(45) Date of Patent: Feb. 18, 2025

(54) DIGITAL DESIGN ENGINE OF A COMPUTER-BASED CONTROL SYSTEM FOR APPAREL MANUFACTURING

(71) Applicant: RAM Group, Inc., Milwaukee, WI (US)

(72) Inventors: Rick A. Marino, Milwaukee, WI (US); Rik deMeyer, Milwaukee, WI (US)

(73) Assignee: RAM Group, Inc., Milwaukee, WI (US)

(*) Notice: Subject to any disclaimer, the term of this patent is extended or adjusted under 35 U.S.C. 154(b) by 734 days.

(21) Appl. No.: 16/537,057

(22) Filed: Aug. 9, 2019

(65) Prior Publication Data

US 2020/0050157 A1 Feb. 13, 2020

Related U.S. Application Data

(60) Provisional application No. 62/717,360, filed on Aug. 10, 2018.

(51) Int. Cl.
| | |
|---|---|
| *G05B 15/02* | (2006.01) |
| *G06F 16/17* | (2019.01) |
| *G06F 16/80* | (2019.01) |
| *G06K 15/02* | (2006.01) |
| *G06Q 50/04* | (2012.01) |

(52) U.S. Cl.
CPC ......... *G05B 15/02* (2013.01); *G06F 16/1734* (2019.01); *G06F 16/80* (2019.01); *G06K 15/021* (2013.01); *G06K 15/1809* (2013.01); *G06Q 50/04* (2013.01)

(58) Field of Classification Search
None
See application file for complete search history.

(56) References Cited

U.S. PATENT DOCUMENTS

| | | | |
|---|---|---|---|
| 8,364,561 B2 | 1/2013 | Wolper et al. | |
| 8,700,477 B2 | 4/2014 | Wolper et al. | |
| 9,345,280 B2 | 5/2016 | Selvarajan | |
| 9,406,172 B2 | 8/2016 | Selvarajan | |
| 9,623,578 B1 | 4/2017 | Aminpour et al. | |
| 9,661,886 B1 | 5/2017 | Selvarajan | |
| 2014/0277683 A1* | 9/2014 | Gupta | G06F 30/00 700/132 |
| 2015/0096108 A1* | 4/2015 | Almeda, Jr. | G06F 1/00 2/244 |
| 2016/0098783 A1* | 4/2016 | Margalit | G06Q 30/0621 705/26.81 |

* cited by examiner

*Primary Examiner* — Mohammad Ali
*Assistant Examiner* — Saad M Kabir
(74) *Attorney, Agent, or Firm* — Fredrikson & Byron, P.A.

(57) ABSTRACT

A digital design engine of a computer-based control system for apparel manufacturing is structured to receive an order specification from a customer computing device and an apparel specification instruction from a designer computing device. At least one order item from the order specification and at least one apparel specification instruction are linked, by the digital design engine, to an extended apparel specification (e.g., a master pattern definition) such that at least one parameter in the extended apparel specification is set based on the order item and/or based on the apparel specification. The digital design engine is structured to add the extended apparel specification to a plurality of apparel specifications collectively defining a custom article of apparel.

26 Claims, 18 Drawing Sheets

FIG. 1

```
                                                                    ← 600
┌─────────────────────────────┐─ 602
│ Team: City Slickers         │
├─────────────────────────────┤
│ Name  Number    Size   Sku  │
│ Jim    10       L           │─ 604
│ john   22       2X +$2.00   │
│ jimmy  66       S           │
├─────────────────────────────┤
│ Sizes                       │
│ Size   Sku    Quantity      │
│ L              1            │─ 606
│ 2X +$2.00      1            │
│ S              1            │
├─────────────────────────────┤
│ Color 1     Yellow (■#FFDD00)│
│ Color 2     Dark Royal (■#003773) │─ 608
│ Color 2                     │
├─────────────────────────────────────────────────────────┐
│ Front Logo    563                                       │
│ Logo Color 1 Black (■#0D0D0D)                           │
│ Logo Color 2 Charcoal (■#58595B)                        │
│ Logo Color 3 Optic Yellow (■#EEE809)                    │
│ Logo Notes:                                             │
│ Chest Logo                                              │
│ Images                                                  │
│ Key    Image Download                                   │
│ left-sleeve-logo                                        │── 610
│       https://api.kitbuilder.co.uk/api/File/48600437?distributorid=4760030&download=True │
│ Right Sleeve Logo                                       │
│ Images                                                  │
│ Key    Image Download                                   │
│ left-sleeve-logo                                        │
│       https://api.kitbuilder.co.uk/api/File/48600437?distributorid=4760030&download=True │
│ Left Sleeve Logo                                        │
│ Images                                                  │
│ Key    Image Download                                   │
│ left-sleeve-logo                                        │
│       https://api.kitbuilder.co.uk/api/File/48600437?distributorid=4760030&download=True │
│ Back Logo                                               │
│ Images                                                  │
│ Key    Image Download                                   │
│ left-sleeve-logo                                        │
│       https://api.kitbuilder.co.uk/api/File/48600437?distributorid=4760030&download=True │
├─────────────────────────────────────────────┬───────────┘
│ Name and Number Style   American Captain    │─ 612
│ Fill Color    Black (■#0D0D0D)              │
│ Outline Color 1    Carolina Blue (■#00C0F3) │
│ Outline Color 2    White (■#FFFFFF)         │
│ NOTES:                                      │
│ Right Sleeve Number   American Captain      │── 612
│ Left Sleeve Number None                     │
│ Fill Color    Dark Royal (■#003773)         │
│                                             │
│ Outline Color 1    White (■#FFFFFF)         │
│ Outline Color 2    Dark Royal (■#003773)    │
│ Front Number (below front logo)   None      │
│ Fill Color    Kelly Green (■#61A645)        │
│ Outline Color 1    Black (■#0D0D0D)         │
│ Outline Color 2    White (■#FFFFFF)         │
├─────────────────────────────────────────────┤
│ Choose your Fabric Magic                    │─ 614
└─────────────────────────────────────────────┘
```

FIG. 6

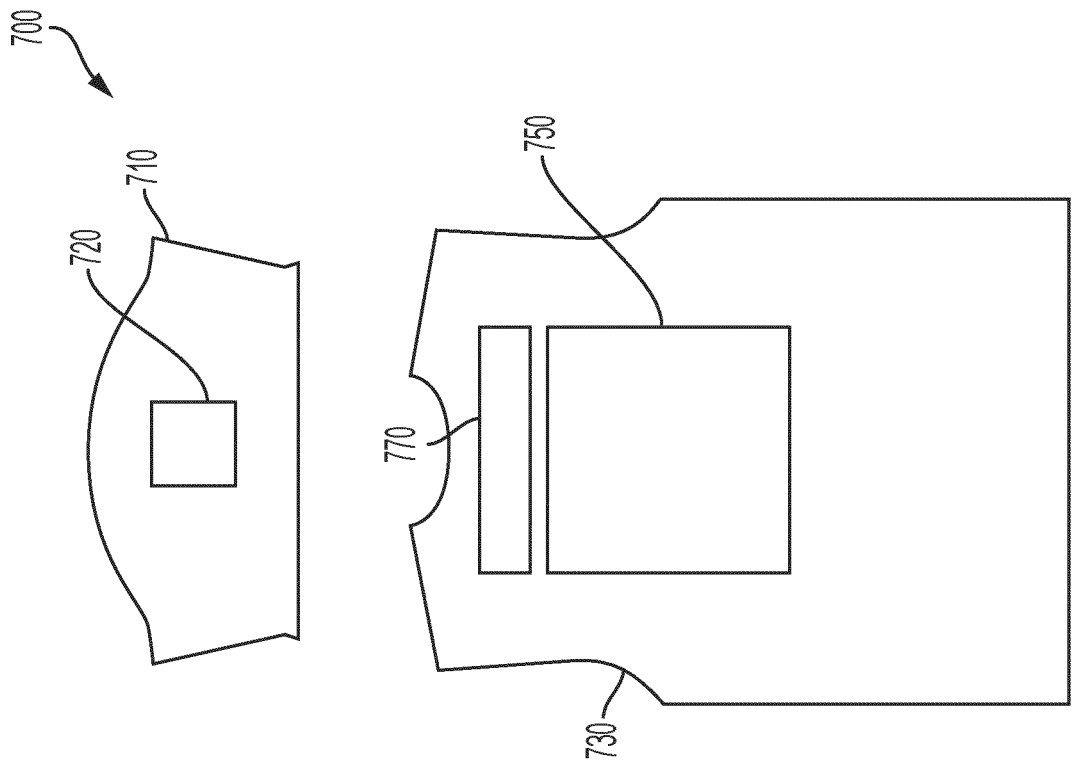
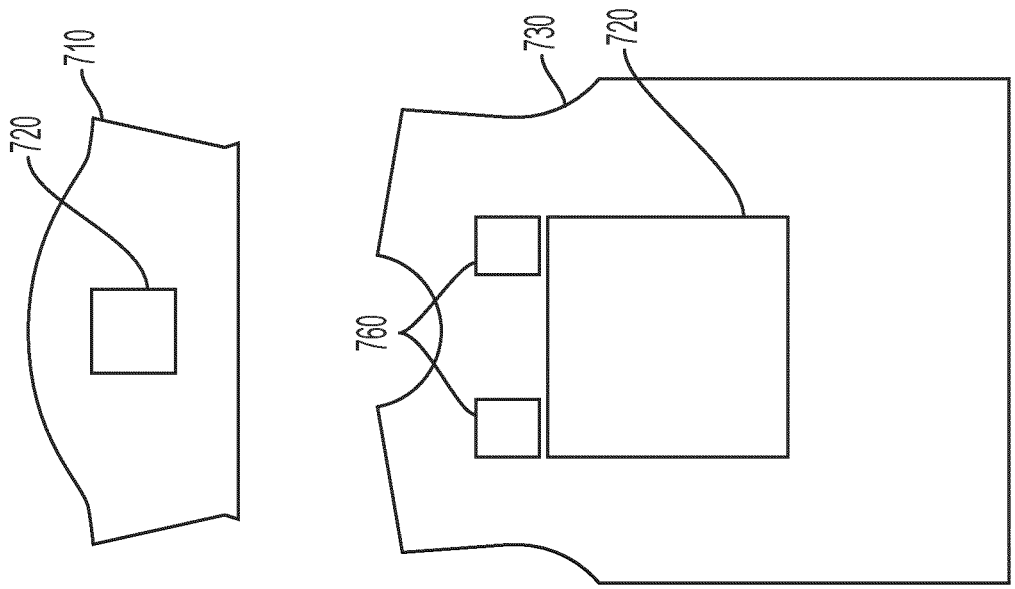
FIG. 7

DIGITAL DESIGN ENGINE OF A COMPUTER-BASED CONTROL SYSTEM FOR APPAREL MANUFACTURING

CROSS-REFERENCE TO RELATED APPLICATIONS

The present application claims the benefit of and priority to U.S. Provisional Application No. 62/717,360, titled "DIGITAL DESIGN ENGINE FOR APPAREL MANUFACTURING," filed Aug. 10, 2018, which is hereby incorporated by reference herein in its entirety.

BACKGROUND

Manufacturing of custom apparel, such as shirts, uniforms, and the like, requires gathering and keeping track of customer specifications regarding the desired item of apparel, such as its color scheme, sleeve length, any logos, apparel size, etc. Conventionally, such items of apparel are created individually or in small batches according to customer specifications. Problematically, conventional small-batch apparel manufacture techniques are costly, error-prone, and result in extended time to delivery because conventional textile printing and other apparel production processes do not accommodate the small-batch production requirements. For example, if an item of apparel requires fabrics of different types, then several textile printers (each configured to use particular fabric) may need to be used to print consistent with specifications provided by the user on the different fabrics, and production of these components needs to be coordinated. Additionally, a designer may be required to create a variant of an already existing design specification based on the customer's order. The variant may be substantially similar to an already existing design, which results in an unsustainably high number of design files to manage as a manufacturer's customer list grows.

SUMMARY

An example embodiment relates to a computer-based control system for apparel manufacturing. The computer-based control system comprises at least one processor, a network interface circuit, and a digital design engine. The computer-based control system is structured to receive an order specification and an apparel specification instruction. The computer-based control system is structured to generate an extended apparel specification. The computer-based control system is structured to link, by an order builder circuit of the digital design engine, at least one order item from the order specification and at least one apparel specification instruction, comprising: using the at least one apparel specification, obtain the extended apparel specification from an apparel specification data source and set at least one parameter in the extended apparel specification based on the order item. The computer-based control system is structured to add the extended apparel specification to a plurality of apparel specifications collectively defining a custom article of apparel. The computer-based control system is structured to generate, for each of the plurality of apparel specifications, by a job specification circuit of the digital design engine, a job specification based on the extended apparel specification.

Other embodiments contemplated herein refer to a computer-implemented method performing the above processes and a non-transitory computer readable medium comprising instructions that, when executed, cause at least one processor of a computing system to perform the computer-implemented method.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 6 shows an example order specification comprising multiple segments.

FIG. 7 shows an example apparel specification layout with markers for custom image placement.

DETAILED DESCRIPTION

Referring generally to the figures, systems and methods for a computer-based control system for apparel manufacturing are shown. As will be appreciated, a digital design engine of the computer-based control system for apparel manufacturing is structured to receive an order specification from a customer computing device and an apparel specification instruction from a designer computing device. According to various embodiments, any of the order specification and the apparel specification instruction can be a text file and/or an electronic message that includes data labels and data values in a format decodable by the digital design engine (e.g., JSON, REST, SOAP, XML RPC, etc.). At least one order item from the order specification and at least one apparel specification instruction are linked, by the digital design engine, to an extended apparel specification (e.g., a master pattern definition) such that at least one parameter in the extended apparel specification is set based on the order item and/or based on the apparel specification. The digital design engine is structured to add the extended apparel specification to a plurality of apparel specifications collectively defining a custom article of apparel. For each of the plurality of apparel specifications, the digital design engine is structured to generate a job specification based on the extended apparel specification and route the job specification to an apparel printer. In some embodiments, the job specification file contains cutting instructions and is routed to a cut production system, cutting equipment, or similar.

Figure 1:
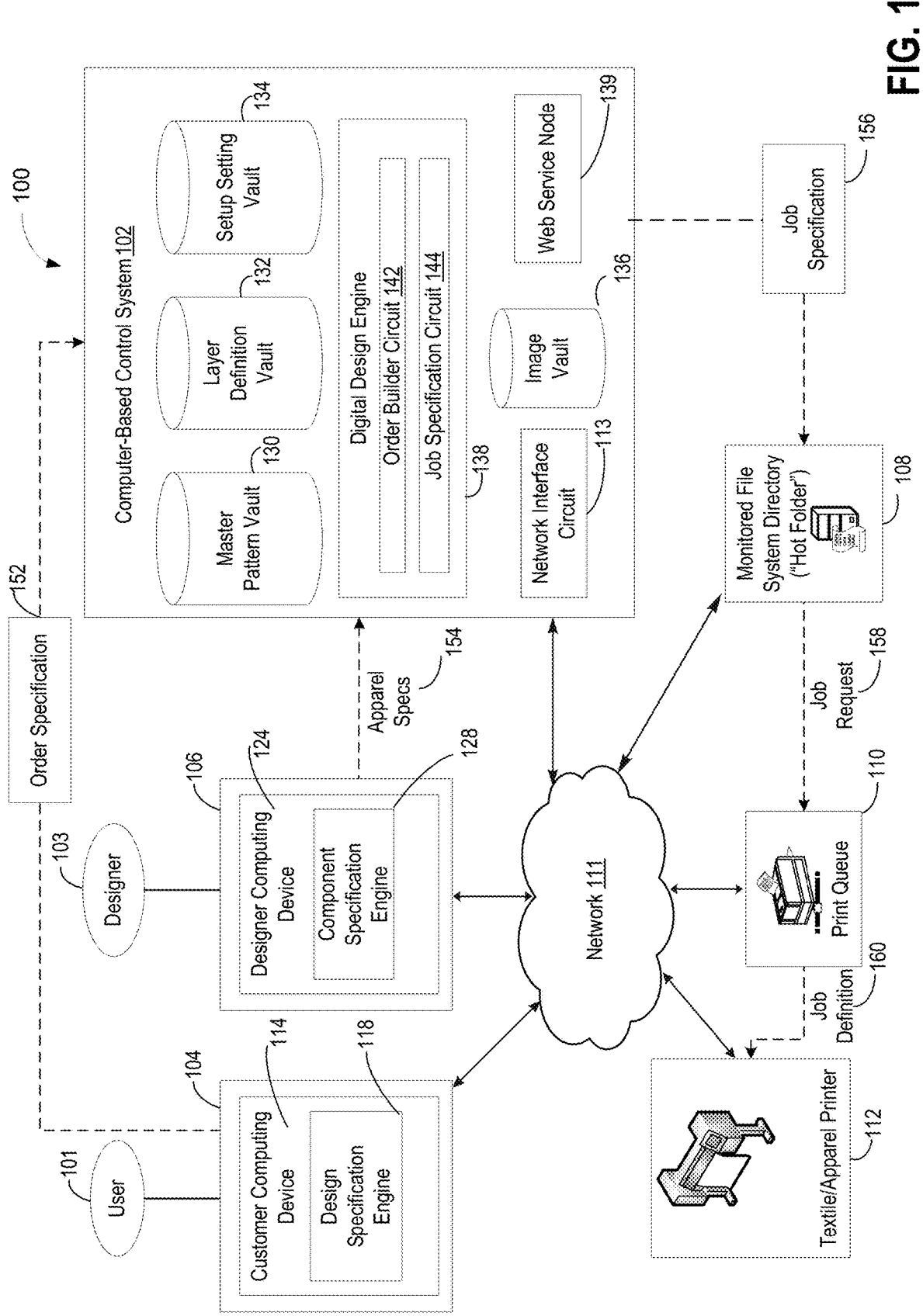
FIG. 1 is a block diagram of a computer-based control system for apparel manufacturing, including a digital design engine.

FIG. 1 is a block diagram of an environment 100 of a computer-based control system 102 for apparel manufacturing, including a digital design engine 138, according to an example embodiment. In brief overview, the environment 100 includes the computer-based control system 102, a customer computing device 104, a designer computing device 106, a hosted monitored file system directory structure 108, a hosted print queue 110, and an apparel printer 112. All or some components of the environment 100 may be implemented as stand-alone device(s), as distributed systems having components hosted and/or managed from distinct geographical locations, as cloud-based systems hosted by an entity other than the owner and/or operator of the respective entity, etc. All or some components of the environment 100 may be communicatively coupled to file and/or database servers, application delivery servers, website servers, web service nodes, file servers, client devices, etc.

As a general overview, the apparel design process facilitated by the computer-based control system 102 includes a data interchange infrastructure that supports the exchange and integration of three types of data: order specifications from a customer, apparel specifications from a designer, and extended apparel specifications from the manufacturer (e.g., master files, master patterns, etc.) that link the order specifications to apparel specifications and supplement these with various technical settings, such as printer setup settings, which are needed to produce the item of apparel. The order specifications provide the information required by the manufacturer (e.g., owner or operator of the computer-based control system 102) to fulfill any orders placed by a customer. The apparel specifications provide the information required by the manufacturer (e.g., owner or operator of the computer-based control system 102) to manufacture the article of apparel ordered by the customer. In some embodiments, the apparel specifications are provided by a designer 103 in the form of a technical packet (tech pack), specification sheet, or similar. The extended apparel specifications provide a library of data and instructions that can be customized (further configured) to produce a particular article of apparel to customer specifications.

In the environment 100, electronic communication between the computer-based control system 102, customer computing device 104, designer computing device 106, hosted monitored file system directory structure 108, hosted print queue 110, and an apparel printer 112 is facilitated by the network 111. The network 111 is a data exchange medium, which may include wireless networks (e.g., cellular networks, Bluetooth® wireless network, WiFi, Zigbee® wireless network, etc.), wired networks (e.g., Ethernet, DSL, cable, fiber-based, etc.), or a combination thereof. In some embodiments or combinations, the network 111 includes a local area network or a wide area network. In some embodiments, the network 111 includes the Internet. The network 111 is facilitated by short-and/or long-range communication technologies, such as Bluetooth® wireless network transceivers, Bluetooth® wireless network beacons, RFID transceivers, NFC transceivers, Wi-Fi transceivers, cellular transceivers, wired network connections (e.g., Ethernet), etc. Various communication protocols can be used, including, for example, any of the Internet protocol (IP), transmission control protocol (TCP), hypertext transfer protocol (http), simple object access protocol (SOAP), file transfer protocol (FTP), etc. Secure versions of any of the above protocols (e.g., IP Sec, https://, etc.) may be used as appropriate.

Each of the computer-based control system 102, customer computing device 104, designer computing device 106, hosted monitored file system directory structure 108, hosted print queue 110, and apparel printer 112 have respective network interface circuits, such as the network interface circuit 113 of the computer-based control system 102 for connecting to the network 111. In some embodiments, data that passes through the network interface circuit 113 is cryptographically protected (e.g., encrypted) such that the network interface circuit 113 is a secure communication module.

Data, messages, packages, etc. may be transferred over the network 111 via an application programming interface (API), which may be configured to specify an appropriate communication protocol using a suitable data interchange format, including any of a SQL data set, a protocol buffer message stream, an instantiated class implemented in a suitable object-oriented programming language (e.g., Java, Ruby, C#, etc.), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC), etc.). Where data is exchanged using an API configured to exchange web service messages, some or all components of the environment 100 may include or may be associated with (e.g., as a client computing device) one or more web service node(s). The web service may be identifiable using a unique network address, such as an IP address, a uniform resource locator (URL), etc. Some or all components of the environment 100 may include circuits structured to access and exchange data using one or more remote procedure call protocols, such as Java remote method invocation (RMI), Windows distributed component object model (DCOM), etc. The web service node(s) may include a web service library comprising callable code functions. The callable code functions may be structured according to a predefined format, which may include a service name (interface name), an operation name (e.g., read, write, initialize a class that defines order data placed by the user 101, etc.), operation input parameters and data type, operation return values and data type, service message format, etc.

The customer computing device 104 of the environment 100 is operated by a user 101. According to various embodiments, the user 101 may be a retail or wholesale customer of a business entity that owns or operates the computer-based control system 102. The user 101 may place one or more orders for a custom item of apparel, such as a shirt with a custom logo. In some embodiments, the order placed by the user 101 includes a single design specification for a single item of apparel. In some embodiments, the order placed by the user 101 includes multiple design specifications for a single item of apparel. For example, the user 101 may order several shirts having the same logo and/or color scheme, in various sizes, for a sports team, a group of employees, etc. In some embodiments, the order placed by the user 101 includes multiple design specifications for multiple items of apparel. For example, the user 101 may order one or more short-sleeve shirts and also one or more hooded long-sleeve shirts. In other embodiments, the user 101 may place orders for off-the-shelf (non-custom) items of apparel. For example, a store that is running low on inventory towards the end of a season may order items of apparel to replenish inventory.

The customer computing device 104, according to various embodiments, may be a smartphone, laptop computer, tablet computer, desktop computer, etc. The customer computing device 104 may include an electronic user interface 114, such as a graphical user interface (GUI) that allows the user 101 to place apparel orders. In some embodiments, the electronic user interface 114 may comprise aural, auditory, tactile, kinesthetic, and/or haptic system(s) and/or component(s) for notifying and interacting with the user 101. For example, the customer computing device 104 may be instructed to buzz, vibrate, trigger an LED light indicator, and/or otherwise alert the user 101 to the alert(s) and/or notification(s) received (for example, from the computer-based control system 102) by the customer computing device 104.

The customer computing device 104 may include and/or may be configured to interact with one or more electronic circuits provided, deployed, and/or managed by the computer-based control system 102. These circuits may be structured to interact with (for example, through an application programming interface (API)) with one or more circuits of the computer-based control system 102. According to various embodiments, these electronic circuits may be deployed to the customer computing device 104 in a "light" fashion such that no installation is required (e.g., made accessible by the user 101 through a web browser, a browser plug-in with navigable controls, a virtual application hosted externally to the customer computing device 104 deployed in a software-as-a-service mode, etc.) or as a fully or partially installed application including executable code packages or the like.

An example electronic circuit deployed at least in part on the computing device 104 is the design specification engine 118. The design specification engine 118 may include an application, a navigable web page, etc. The design specification engine 118 may be configured to provide one or more interactive controls through the electronic user interface 114. These controls may be configured to capture input from the user 101 related to one or more order(s) of the user 101. The controls may be implemented as links, buttons, graphics, etc. that are configured to navigate to an application (e.g., open a window, present a pop-up form, restructure a master user interface to embed the pop-up form such that it is part of the master interface, etc.). In some embodiments, the design specification engine 118 is structured to capture user-entered values relating to building an order specification, such as the order specification 152.

The designer computing device 106 is operated by a designer 103. According to various embodiments, the designer 103 may be an employee, supplier, and/or business affiliate of a business entity that owns or operates the computer-based control system 102. The designer 103 may use the designer computing device to generate and/or provide to the computer-based control system 102 various apparel specifications 154.

The designer computing device 106, according to various embodiments, may be a smartphone, laptop computer, tablet computer, desktop computer, etc. The customer computing device 104 may include an electronic user interface 124, such as a graphical user interface (GUI) that allows the designer 103 to submit apparel specifications. In some embodiments, the electronic user interface 124 may comprise aural, auditory, tactile, kinesthetic, and/or haptic system(s) and/or component(s) for notifying and interacting with the designer 103. For example, the designer computing device 106 may be instructed to buzz, vibrate, trigger an LED light indicator, and/or otherwise alert the designer 103 to the alert(s) and/or notification(s) received (for example, from the computer-based control system 102) by the designer computing device 106.

The designer computing device 106 may include and/or may be configured to interact with one or more electronic circuits provided, deployed, and/or managed by the computer-based control system 102. These circuits may be structured to interact with (for example, through an application programming interface (API)) with one or more circuits of the computer-based control system 102. According to various embodiments, these electronic circuits may be deployed to the designer computing device 106 in a "light" fashion such that no installation is required (e.g., made accessible by the designer 103 through a web browser, a browser plug-in with navigable controls, a virtual application hosted outside the designer computing device 106 deployed in a software-as-a-service mode, etc.) or as a fully or partially installed application including executable code packages or the like.

An example electronic circuit deployed at least in part to the designer computing device 106 is the component specification engine 128. The component specification engine 128 may include an application, a navigable web page, a user interface for graphic design, etc. The component specification engine 128 may be configured to provide one or more interactive controls through the electronic user interface 124. These controls may be configured to capture input from the designer 103 related to one or more specification instructions provided by the designer 103. The controls may be implemented as links, buttons, graphics, etc., that are configured to navigate to an application (e.g., open a window, present a pop-up form, restructure a master user interface to embed the pop-up form such that it is part of the master interface, etc.).

In some embodiments, the component specification engine 128 is structured to generate and/or provide to the computer-based control system 102 various apparel specifications 154.

According to various embodiments, the computer-based control system 102 may include at least one electronic circuit and at least one data storage entity. One or more electronic circuit(s) of the computer-based control system 102 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on the customer computing device 104 and/or designer computing device 106. One or more data storage entities of the computer-based control system 102 may be implemented as an electronic structure(s) suitable for storing information, including, for example, one or more persistent electronic structures, such as one or more database(s), electronic file(s), data mart(s), distributed ledger(s) and the like. The data stored in the one or more data storage entities of the computer-based control system 102 may be stored in a multidimensional form such that the structure of the data storage entity has two dimensions (e.g., a look-up table having indexed data) or more (e.g., a relational database, a multi-dimensional database, an online analytical processing (OLAP) cube, etc.). Advantageously, order specification 152 received from the user 101, apparel specifications 154 received from the designer 103, and internal configuration settings can be indexed and grouped for easy retrieval and prioritization by invoice number, order date, delivery date, requested fabric type, by printer, etc.

In an example embodiment of FIG. 1, the computer-based control system 102 includes electronic circuits and data storage entities. Electronic circuits of the computer-based control system 102 include a network interface circuit 113, a digital design engine 138, a order builder circuit 142, a job specification circuit 144, and a web service node 139. The data storage entities of the computer-based control system 102 include a master pattern vault 130, a layer definition vault 132, a setup settings vault 134, and an image vault 136. These circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the environment 100.

As described herein, the network interface circuit 113 is structured to enable all or some components of the computer-based control system 102 to connect to other systems within or outside the environment 100.

The digital design engine 138 is structured to facilitate production and manufacture of articles of apparel. To that end, the digital design engine 138 is structured to generate an extended apparel specification that includes, for example, one or more master pattern(s), one or more layer definition(s) for a vector or raster design program such as Adobe Illustrator, and one or more setup settings. According to various embodiments, some of these elements may be omitted. For example, a vector or raster design program can be used with a single layer, such that the layer definition(s) may be omitted from the extended apparel specification. The purpose of the extended apparel specification is to provide a library of data and instructions that can be customized (further configured) to produce a particular article of apparel. The digital design engine 138 may generate the extended apparel specification in advance of receiving an order.

The digital design engine 138 is further structured to receive an order specification 152 from the customer computing device 104 and to receive apparel specifications 154 from the designer computing device 106.

The order specification 152 includes order information provided by the user 101 and/or automatically collected as the order is placed, such as invoice number, order date, delivery date, requested fabric type, design color options (in some embodiments, selected from up to 64 colors), chest logo, back name, back number, sleeve number, front number, size, quantity, etc. The purpose of the order specification 152 is to provide the information required by the manufacturer (e.g., owner or operator of the computer-based control system 102) to fulfill the order placed by user 101.

According to various embodiments, the order specification 152 can be generated by the digital design engine 138 (e.g., by the order builder circuit 142) of the computer-based control system 102 and/or by the design specification engine 118 of the customer computing device 104. Generally, the order specification 152 is a digital item transmitted by the customer computing device 104 to the computer-based control system 102 via the network 111. The form of this digital item can vary according to various embodiments. As such, the order specification 152 can be provided as any of a SQL data set, a protocol buffer message stream, an instantiated class implemented in a suitable object-oriented programming language (e.g., Java, Ruby, C++, etc.), an XML file, a text file, an Excel file, a web service message in a suitable web service message format (e.g., representational state transfer (REST), simple object access protocol (SOAP), web service definition language (WSDL), JavaScript object notation (JSON), XML, remote procedure call (XML RPC), etc.). In some embodiments, the order specification 152 includes various image and design resources, such as copies of and/or URL link(s) to digital images, digital design files (.ai, .eps, .psd, .pdf, .jpeg, .tiff, etc.), and the like. For example, the user 101 may upload or provide a link to a logo that is to be printed on an article of apparel.

According to various embodiments, the apparel specifications 154 can be generated by the digital design engine 138 of the computer-based control system 102 and/or by the component specification engine 128 of the designer computing device 106. The purpose of the apparel specifications 154 is to provide the information (e.g., design details, technical setup details, and technical production details) required by the manufacturer (e.g., owner or operator of the computer-based control system 102) to manufacture the article of apparel ordered by the user 101. In some embodiments, the apparel specifications 154 are provided in the form of a technical packet (tech pack), specification sheet, or similar. The apparel specifications 154 include setup information provided by the designer 103, such as cut, fabric type (e.g., cotton, polyester, silk, etc.), other material type (e.g., leather, rubber, polyvinyl, etc.), fabric properties (e.g., thickness, thread count, composition, etc.), dimensions and location for custom item placement (logo, embroidery, etc.), resolution (e.g., the minimum pixel density value) and seam allowance supported for custom items, such as images, sloper (base pattern) information, grading (sizing) information, and the like. In some embodiments, the apparel specifications 154 are supplemented or replaced by a designer's production instructions for different items of apparel (e.g., shirts, pants, leggings, etc.) and/or items other than apparel, such as accessories, household items, etc.

The apparel specifications 154 can be provided as any of a SQL data set, a protocol buffer message stream, an instantiated class implemented in a suitable object-oriented programming language (e.g., Java, Ruby, C++, etc.), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC), etc.). In some embodiments, the apparel specifications 154 include various image and design resources, such as copies of and/or URL link(s) to digital images, digital design files (.ai, .eps, .psd, .pdf, .jpeg, .tiff, etc.), and the like. In some embodiments, such image and design resources (e.g., vector graphics) are generated by designer 103 on the designer computing device 106 using an application and/or a plug-in deployed to the designer computing device 106 and/or controlled by the computer-based control system 102. For example, in some embodiments, the application and/or plug in may be a full or "light" version of a graphic design application, such as Adobe Illustrator, Adobe Lightroom, Marvelous Designer, Inkscape, GIMP, OpenOffice Draw, or a proprietary application. In some embodiments, the image and design resources are generated outside of the designer computing device 106, computer-based control system 102, or both. For example, the image and digital resources included in apparel specifications 154 may include a link, an address, etc., of a remote location external to the environment 100, which may be configured to provide the requested resources to the computer-based control system 102 when queried by the computer-based control system 102.

The apparel specifications 154 may include various components that together comprise digital instructions for generating an item of apparel by the computer-based control system 102. These digital instructions may comprise data sets (e.g., an array, a table etc.) denoting various design components and domains of values therefor. For instance, a size instruction may include definitions, measurements, sloper information, seam allowances, grading information, etc. for sizes XS, S, M, L, XL, XXL, etc. Another size instruction may include definitions and the measurements, sloper information, seam allowances, grading information, etc. for sizes 26, 28, 30, 32, 34, etc. The measurements may include individual measurements for various components of the article of apparel. For example, if the article of apparel is a shirt, the measurements may include a shoulder seam length, a sleeve width, a sleeve length, armhole length, neck opening length, collar dimensions, body length, body width, etc. Other digital instructions included in the apparel specifications 154 may include cut, fabric type (e.g., cotton, polyester, silk, etc.), other material type (e.g., leather, rubber, polyvinyl, etc.), fabric properties (e.g., thickness, thread count, etc.), dimensions and location for custom item placement (logo, embroidery, etc.), resolution (e.g., the minimum pixel density value) and seam allowance supported for custom items, such as images, and the like. In some embodiments, the minimum pixel density value required by the computer-based control system 102 may be set to a predetermined threshold value, such as at least 200 ppi (pixels per inch). In some embodiments, the digital instructions included in the apparel specifications 154 may include printer specifications, such as apparel print method (e.g., silk screen, heat transfer, ink jet transfer, sublimation, direct-to-garment, etc.) and/or apparel printer type (e.g., flat screen, rotary screen, ink jet, wax jet, transfer printer, etc.).

The digital design engine 138 may use the information provided in the apparel specification 154 to generate and/or update the extended design specification. For example, in some embodiments, the extended design specification may generally specify that a shirt requires a front panel, a back panel, collar definition settings, and a sleeve cutout. The apparel specification 154 provided by the designer 103 may more particularly specify that the shirt requires a polo collar, short sleeves with particular dimensions based on size, the sizes and dimensions for the front panel and back panel, a set of available colors in a first color scheme for the front panel and the back panel, a set of available colors in a second color scheme for the sleeves, and a location of any customer logos to be printed on the front panel. In some embodiments, multiple apparel specifications 154 can be associated with an extended apparel specification. In some embodiments, a single apparel specification 154 can reference multiple extended apparel specifications (e.g., printer settings, article of manufacture settings, etc.).

After a customer order is received, the digital design engine 138 is structured to link, by the order builder circuit 142, at least one order item from the order specification 152 and at least one apparel specification instruction 154 such that a complete order can be generated. This process can include obtaining the extended apparel specification from an apparel specification data source (such as the master pattern vault 130, layer definition vault 132, setup settings vault 134, etc.). The process can further include setting at least one parameter in the extended apparel specification based on the order item. For example, the order specification 152 may be a digital message and/or file that includes multiple data items, such as an invoice number, order date, delivery date, requested fabric type, design color options, chest logo, back name, back number, sleeve number, front number, size, and quantity. The order specification 152 may further include an article identifier that specifies a particular apparel specification 154 that defines the desired item (e.g., "a two-tone short-sleeved shirt with a polo collar and a customizable front logo.") The apparel specification 154 may be associated with a particular extended apparel specification that generally specifies the cutouts for the requested type of article. The digital design engine 138 may be structured to query the extended apparel specification, using the apparel specification 154 derived from the article identifier included in the order specification 152, in order to determine the data required to manufacture the item. For example, the extended apparel specification may specify that each shirt requires a size and a quantity. The digital design engine 138 may parse the order specification 152 to extract the values for these items. For example, if the order specification 152 is a flat file, the digital design engine 138 may traverse each record in the file to locate a pre-determined separator (a pipe, a semicolon, etc.) and, based on encountering the pre-determined separator, identify a first segment in the order specification 152 that is populated with a value that denotes the desired size (e.g., "L") and the desired quantity (e.g., "1"). In another example, the digital design engine 138 may traverse (evaluate) each record in the file to determine a start point and an end point of each segment and extract the segments (e.g., using a string truncation function or similar) that denote the desired size and desired quantity. The digital design engine 138 may complete the extended apparel specification with the extracted information such that the ordered item can be manufactured.

In some embodiments, all or some of the information exchanged between the customer computing device 104, the designer computing device 106, and the computer-based control system 102 can be encoded in a structured format, such as JSON. In some embodiments, the digital design engine 138 includes and/or is communicatively coupled to a web service node 139. The purpose of the web service node 139 is to provide specifications for the format of the order specification 152, the apparel specification 154, and other data received and/or transmitted by the computer-based control system 102. For example, in some embodiments, the order specification 152 and/or the apparel specification 154 is a web service message (e.g., a message constructed using JSON). The web service message can be generated by the digital design engine 138 by from the data entered via user interface(s) of the customer computing device 104 and/or the designer computing device 106. For example, the digital design engine 138 may provide instructions to the design specification engine 118 and/or component specification engine 128 to generate and transmit a text file and/or an electronic message that includes data labels and data values in a format decodable by the digital design engine 138 through the web service node 139 (e.g., JSON, REST, SOAP, XML RPC, etc.). When the file and/or message (e.g., the order specification 152 and/or the apparel specification 154) is received by the computer-based control system 102 via the network interface circuit 113, the file is parsed (evaluated) to extract the appropriate data items (e.g., size, quantity, etc.) and the data items can be subsequently used to fill in the blanks in the extended apparel specification.

The data storage entities of the computer-based control system 102 include a master pattern vault 130, a layer definition vault 132, a setup settings vault 134, and an image vault 136. In some embodiments, the master pattern vault 130 can be structured to store fabric specifications, sleeve cutout templates, front panel cutout templates, back panel cutout templates, collar cutout templates, patterns, pattern fills, sloper (base pattern) information, grading (sizing) information, etc. The layer definition vault 132 can be structured to store various layer specifications for digital imaging software, such as background definitions, image boxes, and text boxes, etc. The setup settings vault 134 can be structured to store at least one of printer identifiers, printer specifications, monitored file system directory paths, and job priority. The image vault 136 can be structured to store copies and/or links to image-based resources, such as logos.

The digital design engine 138 can be structured to update the data in any of the data storage entities based on the information received from the designer computing device 106 in the apparel specification 154. For example, the digital design engine 138 can be structured to update the extended apparel specification associated with the apparel specification 154 to permanently remove or replace a color code from a color schema for all articles manufactured using the computer-based control system 102, to permanently add or remove a printer type and/or a particular printer identifier (network path, IP address of the printer, etc.), and so forth.

In some embodiments, the settings that are stored in the master pattern vault 130, layer definition vault 132, setup settings vault 134, and/or an image vault 136 are indexed by the extended apparel specification identifier. Collectively, the settings from various data storage entities thus define an extended apparel specification and cover multiple facets of article manufacture (e.g., color, fabric options, design, printer configuration, etc.). Advantageously, this setup significantly reduces the amount of data that needs to be managed by a manufacturer and provides for a mix-and-match approach to achieve article customization without manual involvement in the design process for each customer order. In some embodiments, multiple extended apparel specifications collectively define an article of manufacture. For example, a first extended apparel specification may include various pattern and cutout options (front panel, back panel, sleeve, etc.), a second extended apparel specification may include various fabric options, a third extended apparel specification may include various printer settings, etc.

As described above, the digital design engine 138 fills in the blanks in the extended apparel specification(s) based on the order specification 152 and/or the apparel specification 154. The digital design engine 138 then generates a job specification 156 based on the updated and/or combined extended apparel specification(s). An example job specification 156 may include a print file, a set of cutting instructions, etc. In an example embodiment, the job specification is an Adobe Illustrator (.ai) or a similar design file (InDesign, Quark, .eps, .psd, .pdf, etc.). In some embodiments, the .ai file can be pre-populated based on the extended apparel specification. For example, the .ai file can be pre-populated with multiple layer definitions to specify various design properties. The pre-populated .ai file can be further configured by setting properties, by the digital design engine 138, based on the order specification 152 and/or the apparel specification 154. In some embodiments, the pre-populated .ai file is updated with an image provided in the order specification 152 (e.g., as a copy of an image, as a link, etc.) such that the image is printed in an area reserved for customer logos and other pictorial customization. Based on this combined information, the digital design engine 138 can generate the job specification 156. In some embodiments, such as those where printed images are not required, the job specification 156 is supplemented with and/or replaced with material cutting instructions. In some embodiments, the job specification 156 is a print file and a single order specification 152 may result in more than one job specification 156. For example, when printing a collared shirt, two job specifications 156 are sent out as print files, one for the base fabric and one for the base fabric with an interfacing included.

In an example embodiment of FIG. 1, the environment 100 includes a hosted monitored file system directory 108, a hosted print queue 110, and an apparel printer 112.

The hosted monitored file system directory 108 is structured to provide a holding location for one or more job specifications 156 associated with articles waiting to be printed. According to various embodiments, the hosted monitored file system directory 108 can be managed at least in part by the computer-based control system 102. The hosted monitored file system directory 108 can be implemented as a file structure item (e.g., a folder) on a Windows or another suitable operating system.

In some embodiments, the job specification circuit 144 of the digital design engine 138 controls the hosted monitored file system directory 108 at least in part. In some embodiments, the monitored file system directory 108 is managed by a vector or raster design program (e.g., Adobe Illustrator, etc.) The job specification circuit 144 can be structured to transmit the job specification 156 (which, in some embodiments, may comprise an .ai file, a .pdf file, etc.) to the monitored file system directory 108, where the job specification is saved. In some embodiments where the vector or raster design component used so allows, the job specification circuit 144 is structured to periodically (e.g., every 1 min, every 10 min, etc.) conduct an inventory of items in the monitored file system directory by, for example, running a script that identifies each job specification 156, the time it was created, its size, the destination printer, etc. The job specification circuit 144 may generate a job request 158 and place the job request in a print queue 110 associated with one or more apparel printer(s) 112.

The hosted print queue 110 is a code package, server, configurable system directory, etc. structured to manage job requests for one or more apparel printer(s) 112. In some embodiments, the hosted print queue 110 can be configured to order jobs for sending to the apparel printer(s) 112 by time of creation, time of arrival, priority, printer type, fabric type, etc.

The apparel printer 112 can be a flat screen printer, rotary screen printer, ink jet printer, wax jet printer, transfer printer, etc. The apparel printer 112 is structured to accept a job definition 160, which is based on the job request 158 and/or the job specification 156 and print the design, pattern(s), etc. specified in the job specification 156 on a sheet of material specified in the job specification 156, such as fabric, leather, polyvinyl, etc.

Figure 2:
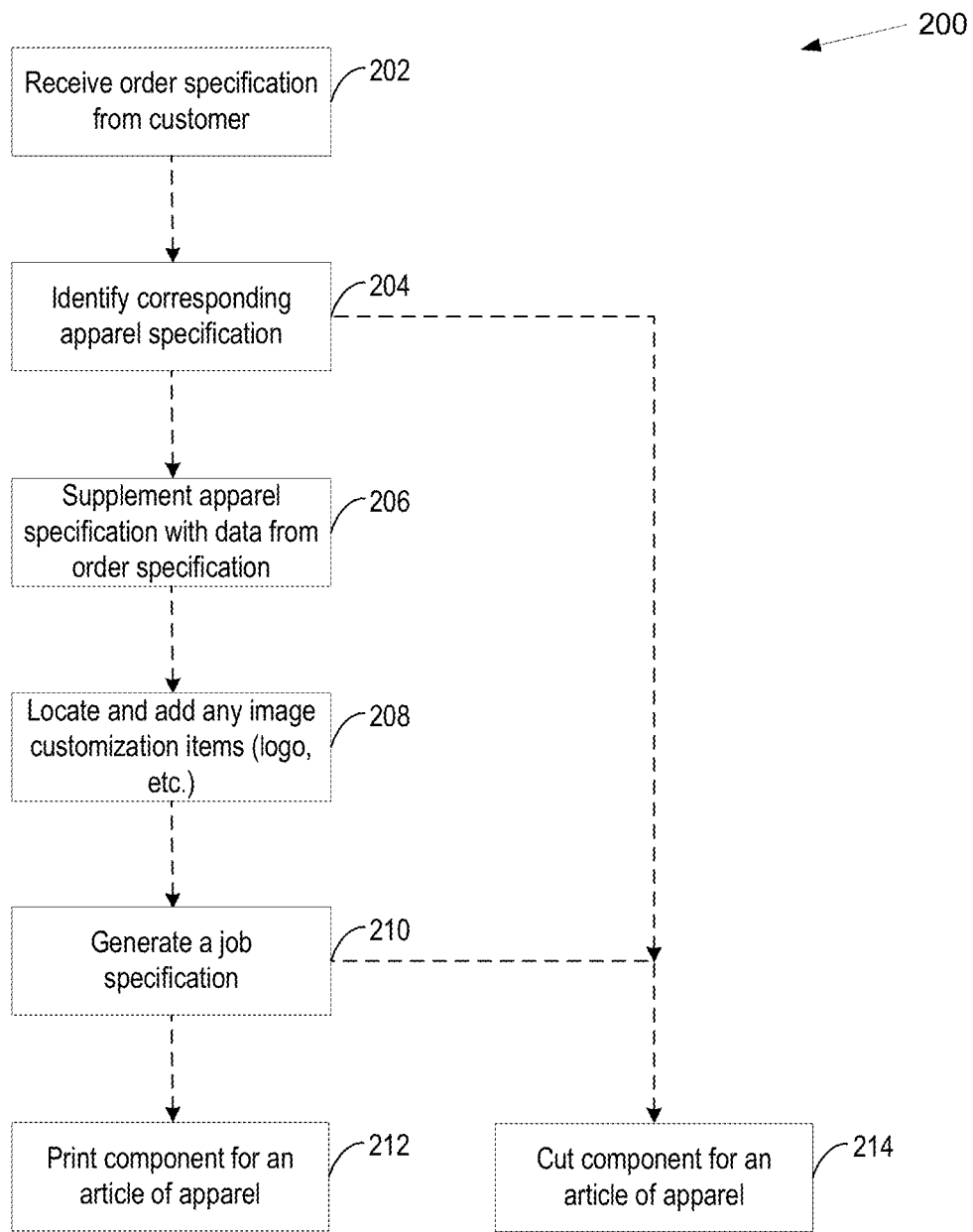
FIG. 2 is a flow diagram of a method of apparel manufacturing using the digital design engine of the computer-based control system for apparel manufacturing of FIG. 1.

FIG. 2 is a flow diagram of a method 200 of apparel manufacturing using the digital design engine 138 of the computer-based control system 102 for apparel manufacturing. The digital design engine 138 is structured to receive an order specification 152, identify a corresponding apparel specification 154, supplement the apparel specification 154 with data from order specification 152, include any image customization items, such as a logo provided by the user 101, generate a job specification 156, instruct the print infrastructure associated with the computer-based control system 102 to print the article of apparel based on the job specification 156, and generate cutting instructions for a component. In some embodiments, some or all of these processes may be omitted or combined. For example, the job specification may include a print file, a cut instruction file, or both. The computer-based control system 102 may be configured to generate instructions for printing a component, cutting a component, or both.

At 202, the digital design engine 138 is structured to receive an order specification 152. The order specification 152 provides the information required by the manufacturer (e.g., owner or operator of the computer-based control system 102) to fulfill any orders placed by user 101.

In some embodiments, the order specification 152 is electronically transmitted to the computer-based control system 102 via the network 111 from the customer computing device 104. In some embodiments, the order specification 152 is generated based on data entered by the user 101 using the interface 114, which can be a GUI delivered via an application managed by the design specification engine 118 on the customer computing device 104, or an applet, a web browser, etc. In some embodiments, the order specification 152 contains multiple order records that are submitted using a batch file or similar, and the interface 114 is configured to allow the user 101 to upload the batch file, which can be a text file, an Excel file, etc. In some embodiments, the order specification is a web service message, such as a JSON file, and the web service node 139, coupled to the digital design engine, is configured to interpret (decode) the data in the web service message according to a pre-determined format, which may include pre-defined field separators, field definitions and labels, field lengths, data types, etc. Thus, in some embodiments, the digital design engine 138 and/or the design specification engine 118 is structured to provide, via the web service node 139, an interface (e.g., remote call functions, an API, etc.) specifying parameters (e.g., message layout, pre-determined format) for the order specification 152. The digital design engine 138 is structured to instruct the customer computing device 104 to provide the order specification 152 via the digital design engine 138 to the computer-based control system 102. The digital design engine 138 is structured to decode the order specification 152, which may include extracting from the order specification 152 at least one of the invoice number, order date, delivery date, requested fabric type, any images, design color options, chest logo, back name, back number, sleeve number, front number, size, and quantity.

In some embodiments, the digital design engine 138 is configured to consolidate multiple orders by grouping and/or indexing the order specifications 152 based on certain data items, such as invoice date, order date, delivery date, requested fabric type, etc. In this manner, production can be coordinated to maximize efficiency. For example, the distribution of job requests 158 to various apparel printers 112 from the print queue 110 can be scheduled based on the indexed data items (also included in the job specification 156) such that job requests 158 are prioritized in the print queue 110.

At 204, the digital design engine 138 is structured to identify an apparel specification 154 for the order specification 152. The apparel specification 154 provides the information (e.g., design details, technical setup details, and technical production details) required by the manufacturer (e.g., owner or operator of the computer-based control system 102) to manufacture the article of apparel ordered by the user 101. In some embodiments, the apparel specifications 154 are provided in the form of a technical packet (tech pack), specification sheet, or similar. The apparel specifications 154 include setup information provided by the designer 103, such as cut, fabric type (e.g., cotton, polyester, silk, etc.), other material type (e.g., leather, rubber, polyvinyl, etc.), fabric properties (e.g., thickness, thread count, etc.), dimensions and location for custom item placement (logo, embroidery, etc.), resolution (e.g., the minimum pixel density value) and seam allowance supported for custom items, such as images, and the like.

In some embodiments, the apparel specification 154 is electronically transmitted to the computer-based control system 102 via the network 111 from the designer computing device 106. In some embodiments, the apparel specification 154 is generated based on data entered by the designer 103 using the interface 124, which can be a GUI delivered via an application running and managed by the component specification engine 128 on the designer computing device 114, or an applet, a web browser, etc. In some embodiments, the apparel specification 154 is generated by the designer 103 in a full or "light" version of a graphic design program, such as Adobe Illustrator. In some embodiments, the apparel specification 154 includes data from at least one of the master pattern vault 130, the layer definition vault 132, and the setup settings vault 134. For example, in some embodiments, the designer 103 may update or modify existing data in any of these entities by providing a new apparel specification 154 (e.g., remove a color from the color library, etc.). Thus, the apparel specification 154 can include any of .ai, .eps, .psd, .pdf, .jpeg, .tiff files, etc.

In some embodiments, the apparel specification 154 is provided at least in part a web service message, such as a JSON file, and the web service node 139, coupled to the digital design engine 138, is configured to interpret (decode) the data in the web service message according to a pre-determined format, which may include pre-defined field separators, field definitions and labels, field lengths, data types, etc. Thus, in some embodiments, the digital design engine 138 and/or the component specification engine 128 is structured to provide, via the web service node 139, an interface (e.g., remote call functions, an API, etc.) specifying parameters (e.g., message layout, pre-determined format) for the apparel specification 154. The digital design engine 138 is structured to instruct the designer computing device 106 to provide the apparel specification 154 via the digital design engine 138 to the computer-based control system 102. The digital design engine 138 is structured to decode the apparel specification 154, which may include extracting from the apparel specification 154 at least one of the cut, fabric type (e.g., cotton, polyester, silk, etc.), other material type (e.g., leather, rubber, polyvinyl, etc.), fabric properties (e.g., thickness, thread count, etc.), dimensions and location for custom item placement (logo, embroidery, etc.), resolution (e.g., the minimum pixel density value) and seam allowance supported for custom items, such as images, and the like. In this fashion, a technical packet (tech pack), specification sheet, or similar can be converted at least in part to a web service message decodable by the digital design engine 138. The web service message may include links to any of supplemental .ai, .eps, .psd, .pdf, .jpeg, .tiff files provided by the designer 103. Advantageously, this implements the design process as a set of computer-based rules that can be performed by the computer-based control system 102 where conventionally tech packs are manually transformed into design specification files necessary for production.

At 206, the digital design engine 138 is structured to supplement the apparel specification 154 with data from order specification 152. As a general overview, this process may include linking the apparel specification 154 to the order specification 152 and further supplementing this data with extended apparel specifications. The extended apparel specifications provide a library of data and instructions (e.g., pattern instructions, layer instructions, printer setup instructions, etc.) that can be customized (further configured) to produce a particular article of apparel.

According to various embodiments, the extended apparel specifications may include all or some information stored in the master pattern vault (e.g., fabric specifications, cutout definitions, templates for apparel components (sleeve, front panel, back panel, etc.), layer definition vault (e.g., background, image box, text box, etc.),the setup settings vault (e.g., printer specifications, monitored file system directory path, job priority, etc.), and the image settings vault (e.g., artwork, etc). The digital design engine 138 can be structured to update the data in any of the data storage entities based on the information received from the designer computing device 106 in the apparel specification 154. Collectively, the settings from various data storage entities define an extended apparel specification and cover multiple facets of article manufacture (e.g., color, fabric options, design, printer configuration, etc.). Advantageously, this setup significantly reduces the amount of data that needs to be managed by a manufacturer and provides for a mix-and-match approach to achieve article customization without manual involvement in the design process for each customer order.

As an example, the order specification 152 may be a digital message and/or file that includes multiple data items, such as an invoice number, order date, delivery date, requested fabric type, design color options, chest logo, back name, back number, sleeve number, front number, size, and quantity. The order specification 152 may further include an article identifier that specifies a particular apparel specification 154 that defines the desired item (e.g., "a two-tone short-sleeved shirt with a polo collar and a customizable front logo."). The apparel specification 154 may be associated with a particular extended apparel specification that generally specifies the cutouts for the requested type of article, etc. The digital design engine 138 may be structured to query the extended apparel specification, using the apparel specification 154 derived from the article identifier included in the order specification 152, in order to determine the data required to manufacture the item. For example, the extended apparel specification may specify that each shirt requires a size and a quantity. The digital design engine 138 may parse the order specification 152 to extract the values for these items. The digital design engine 138 may complete the extended apparel specification with the extracted information such that the ordered item can be manufactured.

At 208, the digital design engine 138 is structured to include any image customization items, such as a logo provided by the user 101. In some embodiments, the order received from the user 101 includes an image resource. For example, the user 101 may upload a custom logo, team mascot, etc. for apparel customization. In some embodiments, the image resource includes a copy of one or more images, which can be provided in a suitable format decodable by the digital design engine 138, such as .ai, .eps, .psd, .pdf, .jpeg, .tiff, etc. In some embodiments, the image resource includes a link to a storage location from which the image can be downloaded. The link may include a URL, an IP address, FTP site credentials, and any other information needed from the digital design engine 138 to download the image resource. In some embodiments, the digital design engine 138 is configured to save the image resource in the image vault 136 hosted by the computer-based control system 102, such that the image resource does not have to be resubmitted by the user 101 in subsequent orders.

At 210, the digital design engine 138 is structured to generate a job specification 156. The job specification 156 can be an extended apparel specification supplemented with information extracted from the order specification 152 and/or the apparel specifications 154. In some embodiments, the digital design engine 138 is structured to retrieve the appropriate definition files (e.g., .ai, .eps, .psd, .pdf, .jpeg, .tiff, etc.) from any of the master pattern vault 130, layer definition vault 132, setup settings vault 134, and image vault 136. The digital design engine 138 is structured to receive and decode any web server message(s) that contain the order specification 152 and/or the apparel specification(s) 154. The digital design engine 138 is structured to combine this information in a single job specification 156 as described, for example, in reference to FIGS. 1 and 206 herein. The job specification 156 can be any of .ai, .eps, .psd, .pdf, .jpeg, .tiff, or another suitable file format.

At 212, the digital design engine 138 is structured to instruct the print infrastructure associated with the computer-based control system 102 to print the article of apparel based on the job specification 156. The print infrastructure can include at least one apparel printer 112. The apparel printer 112 can be associated with a print queue 110, which can be managed, via the monitored file system directory 108, as described in reference to FIG. 1. In some embodiments, the computer-based control system 102 is further structured to generate an invoice associated with the order and transmit the invoice (e.g., email, text, print, etc.) to the user 101. The invoice may include a link to order details.

At 214, the digital design engine 138 is structured to generate cutting instructions for the article of apparel. These instructions may replace or supplement the printing instructions generated at 212. In some embodiments, where only cut instructions are generated such that no artwork is required, some or all of the processes 206-212 may be omitted.

FIGS. 3A-3H are example graphical user interfaces 300, which can be provided to the user 101 though the display of the customer computing device 104. Collectively, the interfaces 300 enable the computer-based control system 102 to gather the data from the user 101 needed to process a custom apparel order. The interfaces 300 can be rendered as application forms, a series of applets, a series of pages in a web browser, etc.

In some embodiments, the interfaces 300 are a series of forms or similar, refreshed on the display of the customer computing device 104 as the user 101 navigates the order process. The interfaces 300 can be rendered in a single container, such as the interface 114 of the customer computing device 104, by the design specification engine 118.

For example, as shown, each of the interfaces 300 in FIGS. 3A-3H can include common components, such as the article window 302, a 3D article rendering 304, a view back button 306, a 360-degree control 308, and the article identifier 309. In the example embodiment shown, the article window 302 can be populated in response to detecting a user selection of the article identifier 309, which in some embodiments can be associated with a particular apparel specification 154. The 3D article rendering 304 can be rendered based on the particular apparel specification 154, which may include a 3D view of an article created in suitable graphic design software, such as Marvelous Designer or similar. The view back button 306 allows the user to view the back of the article, which initially is rendered in front view. The 360-degree control 308 is a rotational control that repositions the 3D article rendering 304 by turning it by a number of degrees determined based on the user interaction with the 360-degree control 308. In some embodiments, this determination is based on how long the user presses and holds the 360-degree control 308, whether the user interface 114 detects directional motion while the user presses and holds the 360-degree control 308, etc.

Each of the interfaces 300 in FIGS. 3A-3H can further include a navigable panel 310, which may include various navigation options, such as the view basket button 312, the next button 315, etc.

Each of the interfaces 300 in FIGS. 3A-3H can further include a design navigator control 320. The content of the design navigator control 320 can be customized as the user 101 progresses through the order process. The design navigator control 320 can include digitally expandable bookmarked locations that correspond to various facets of the order.

Figure 3A:
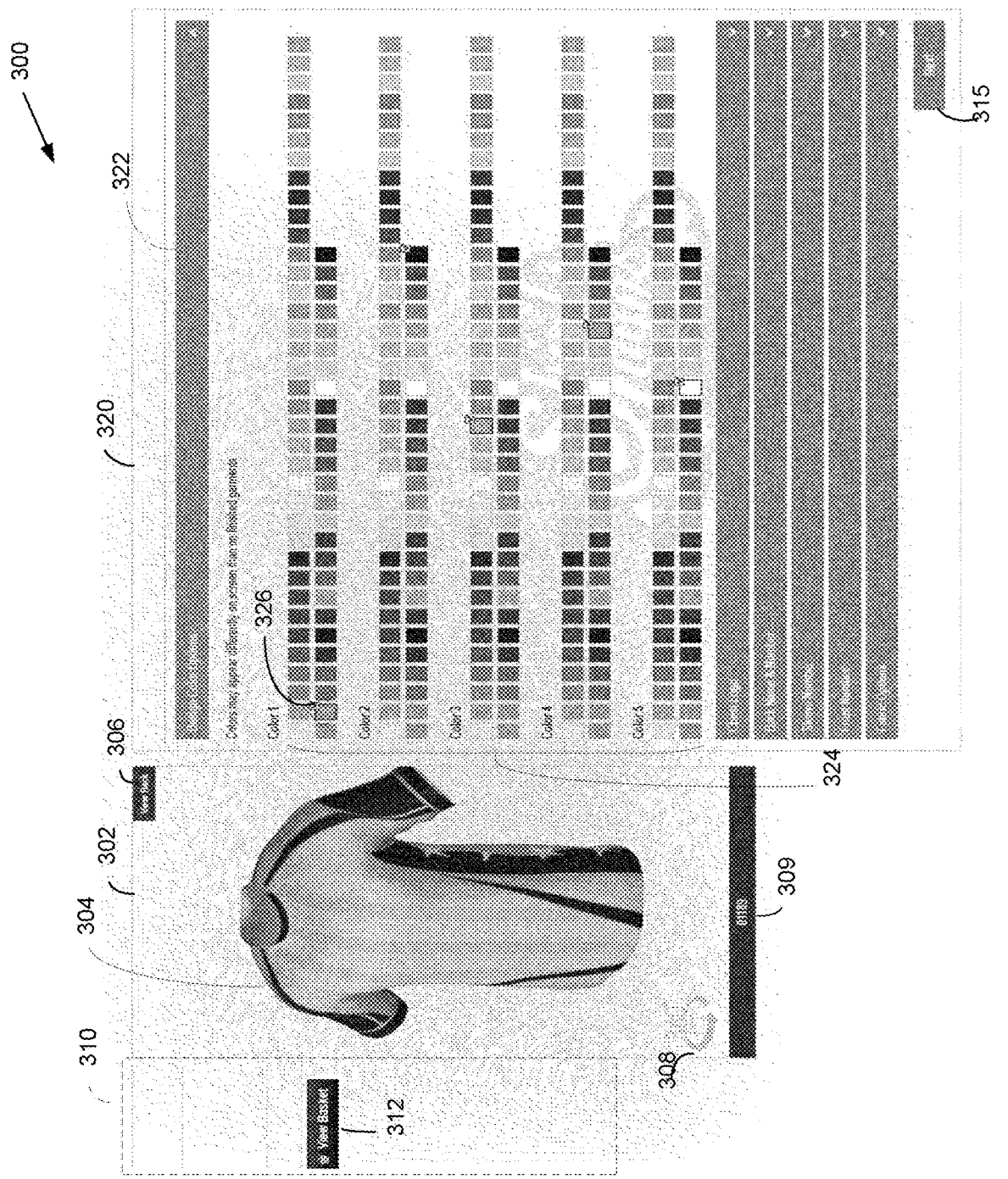
FIGS. 3A-3H are example graphical user interfaces associated with a design specification engine of the computer-based control system for apparel manufacturing, wherein the design engine is provided to a user through a customer computing device via a display thereof.

Referring now to FIG. 3A, the design navigator control 320 is configured to expand at the design color options bookmark 322. The design color options bookmark 322 provides a user interface for making a selection from a plurality of colors 324, where each color selection control 326 can correspond to a color schema of the particular design associated with the article identifier 309. Responsive to detecting a user interaction with the color selection control 326, the design specification engine 118 is structured to capture the color code (e.g., a unique HTML color code, etc.) associated with the selected color. The information provided using the controls herein can be included in the order specification 152.

Figure 3B:
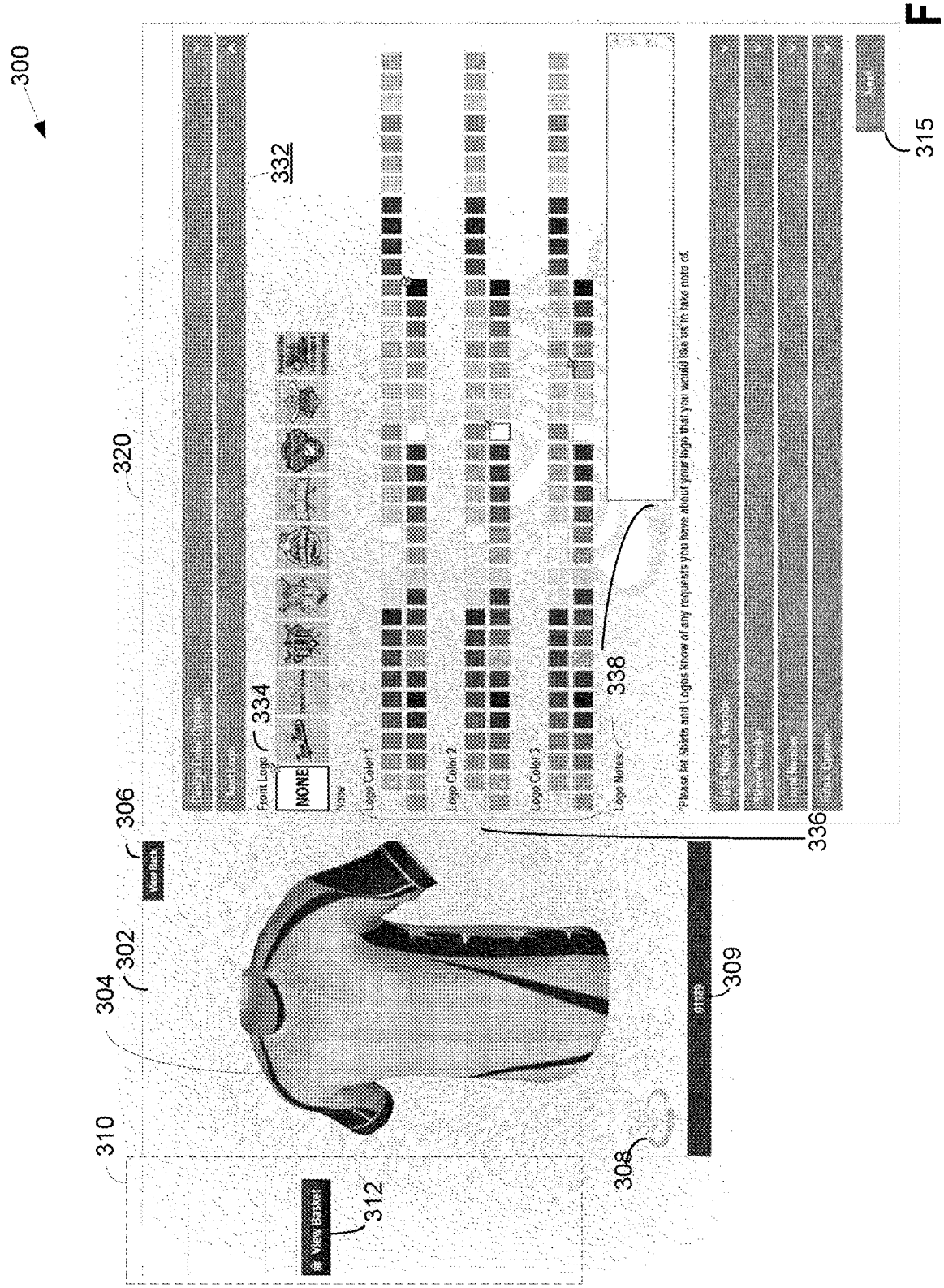

Referring now to FIG. 3B, the design navigator control 320 is configured to expand at the chest logo bookmark 332. The chest logo bookmark 332 provides a user interface for making a selection using a front logo selection control 334, where each front logo color selection control 336 can correspond to a color schema for further customizing the front logo selected using the front logo selection control 334. Responsive to detecting a user interaction with the front logo selection control 334, the design specification engine 118 is structured to capture the color code (e.g., a unique HTML color code, etc.) associated with the selected color. The color code can be included in the order specification 152. At 338, the user 101 can supply additional notes associated with the logo. The information provided using the controls herein can be included in the order specification 152. In some embodiments, if notes are provided, the computer-based control system 102 can be structured to bypass all or some of the processes performed to programmatically generate the job specification. For example, the computer-based control system 102 can be structured to route the order to a work queue for manual review, trigger an email message to customer service, generate a report for review, etc.

Figure 3C:
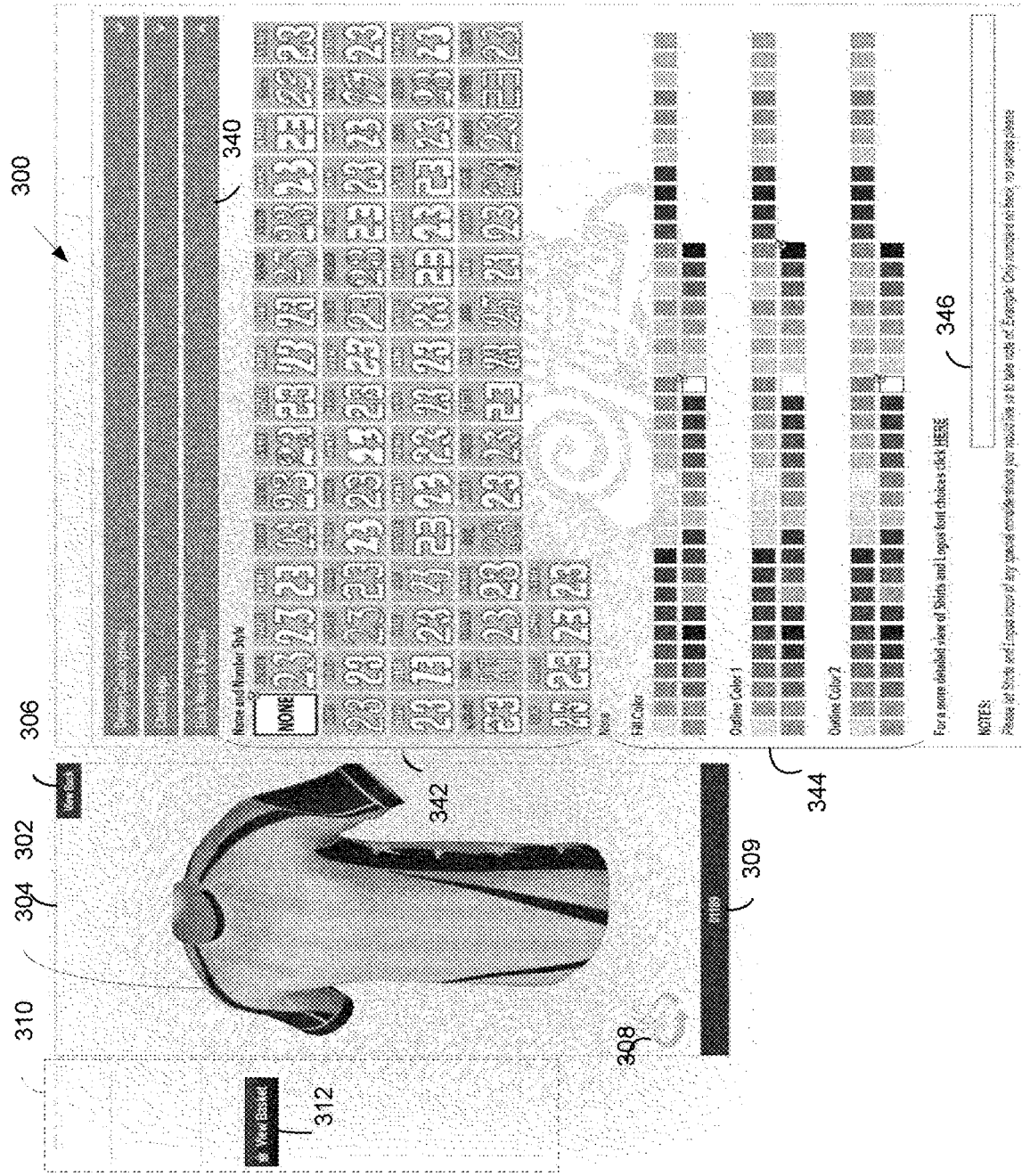

Referring now to FIG. 3C, the design navigator control 320 is configured to expand at the back name and number bookmark 340. The back name and number bookmark 340 provides a user interface for making a selection using a name and number style selection control 342, where each name and number style selection control 342 can correspond to a color schema 344 for further customizing the fill color. Responsive to detecting a user interaction with the name and number style selection control 342 and/or the color schema 344, the design specification engine 118 is structured to capture the color code (e.g., a unique HTML color code, etc.) associated with the selected color. The information provided using the controls herein can be included in the order specification 152. At 346, the user 101 can supply additional notes associated with the name and number style selection. In some embodiments, if notes are provided, the computer-based control system 102 can be structured to bypass all or some of the processes performed to programmatically generate the job specification.

Figure 3D:
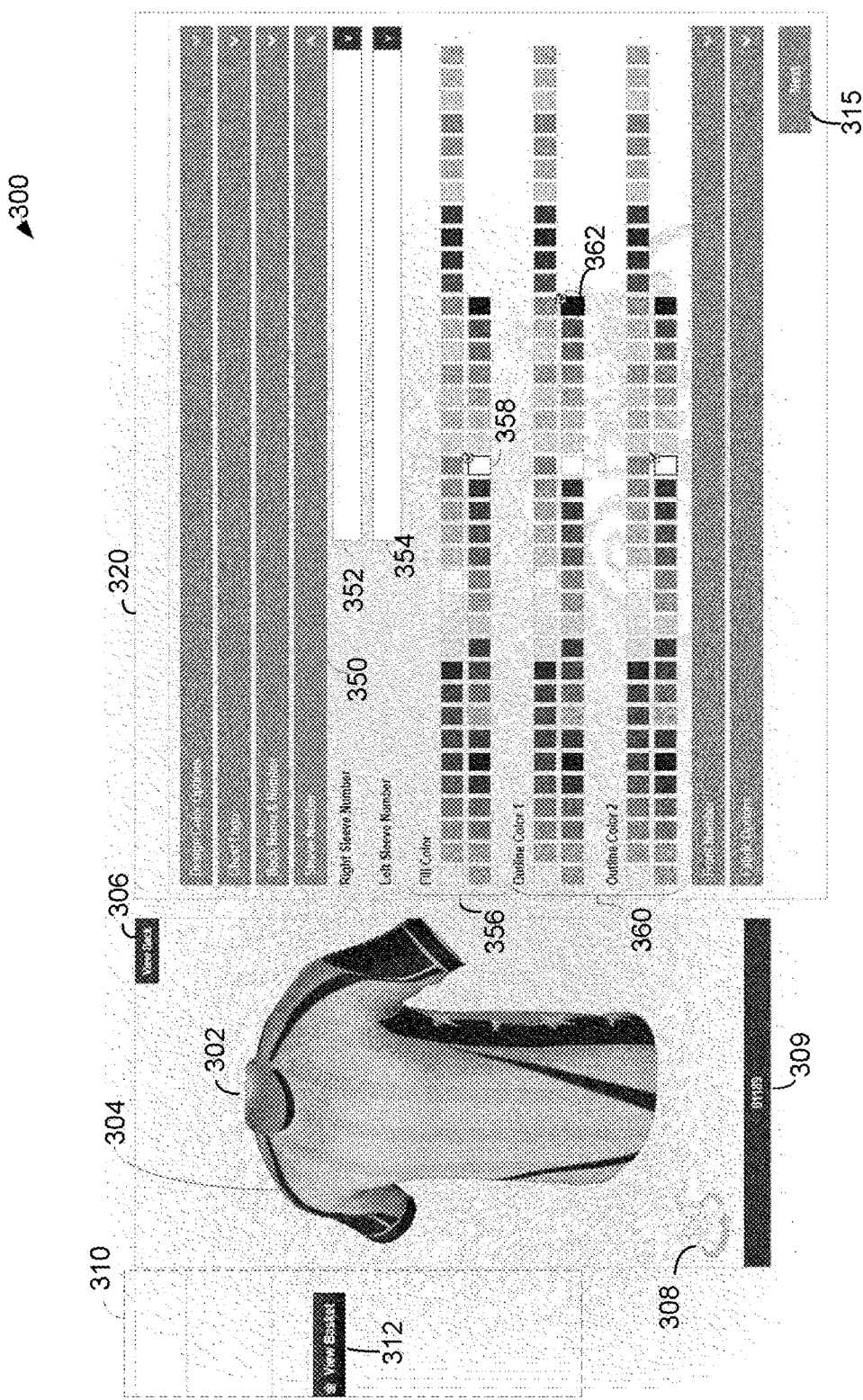

Referring now to FIG. 3D, the design navigator control 320 is configured to expand at the sleeve number bookmark 350. The sleeve number bookmark 350 provides a user interface for making a selection using the right sleeve number control 352 and the left sleeve number control 354, further including the ability to specify the fill color 356 and the outline color 360. Responsive to detecting a user interaction with the fill color 356 and/or the outline color 360, the design specification engine 118 is structured to capture the color code (e.g., a unique HTML color code, etc.) associated with the selected color. The information provided using the controls herein can be included in the order specification 152.

Figure 3E:
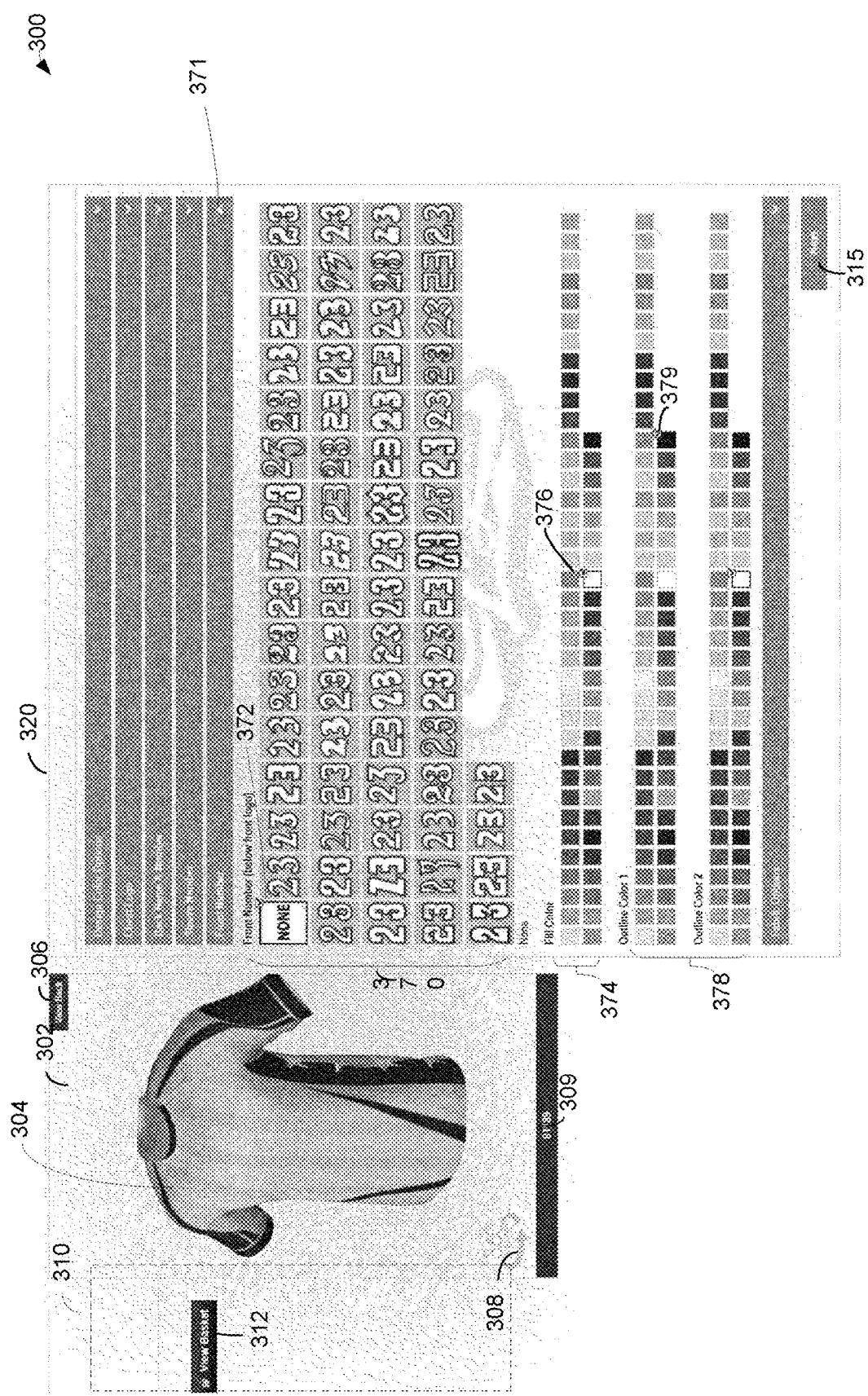

Referring now to FIG. 3E, the design navigator control 320 is configured to expand at the front number bookmark 371. The front number bookmark 371 provides a user interface for making selections 372, 376, and 379 using the front number control 370, the fill color control 374 and the outline color control 378. Responsive to detecting user selections 372, 376, or 379, the design specification engine 118 is structured to capture the color code (e.g., a unique HTML color code, etc.) associated with the selected color. The information provided using the controls herein can be included in the order specification 152.

Figure 3F:
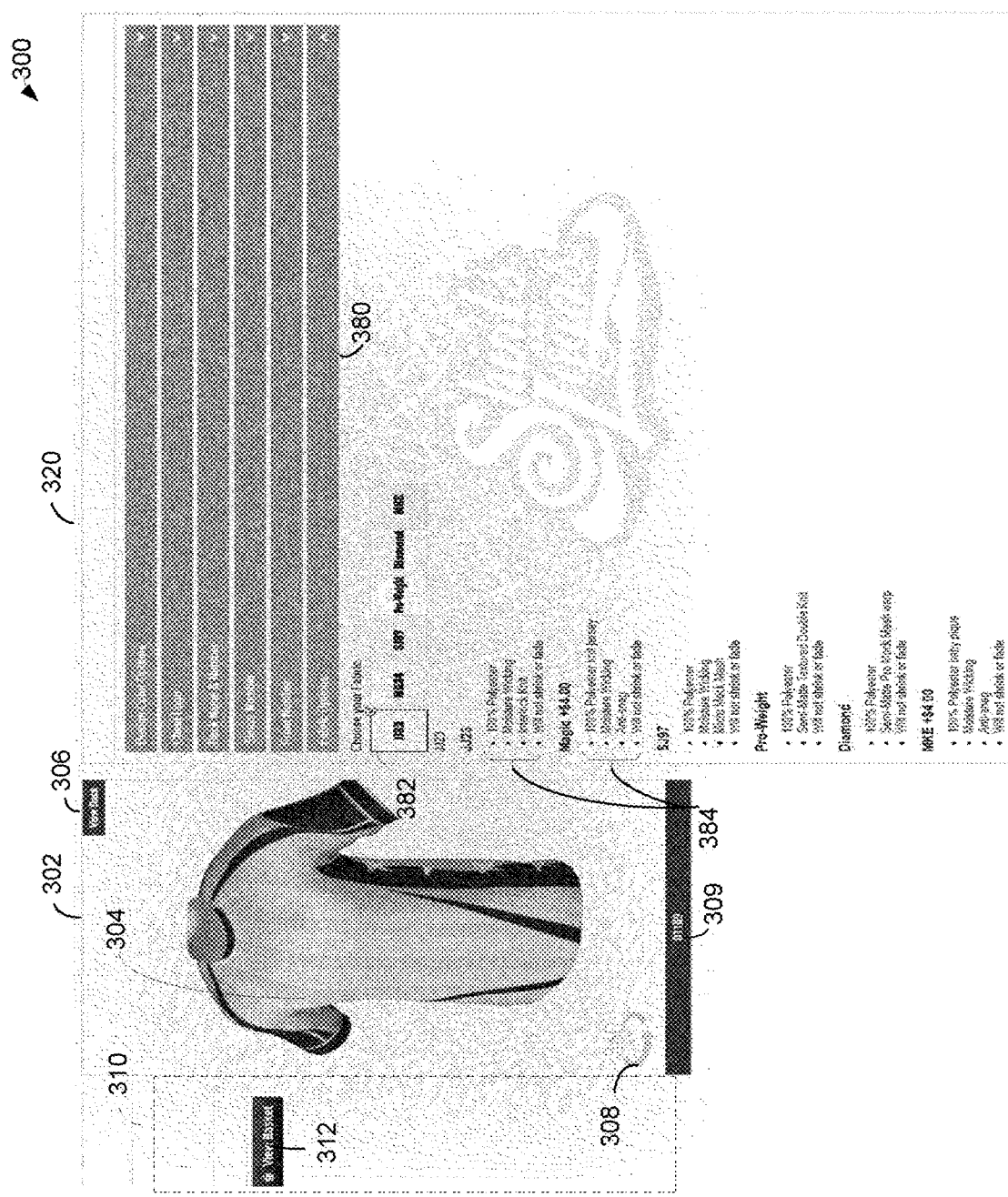

Referring now to FIG. 3F, the design navigator control 320 is configured to expand at the fabric options bookmark 380. The fabric options bookmark 380 provides a user interface for making a fabric selection using the fabric selection control 382. Each fabric selection is associated with the fabric properties 384. Responsive to detecting user interaction with the fabric selection control 382, the design specification engine 118 is structured to capture the information associated with the selected color. The information provided using the controls herein can be included in the order specification 152.

Figure 3G:
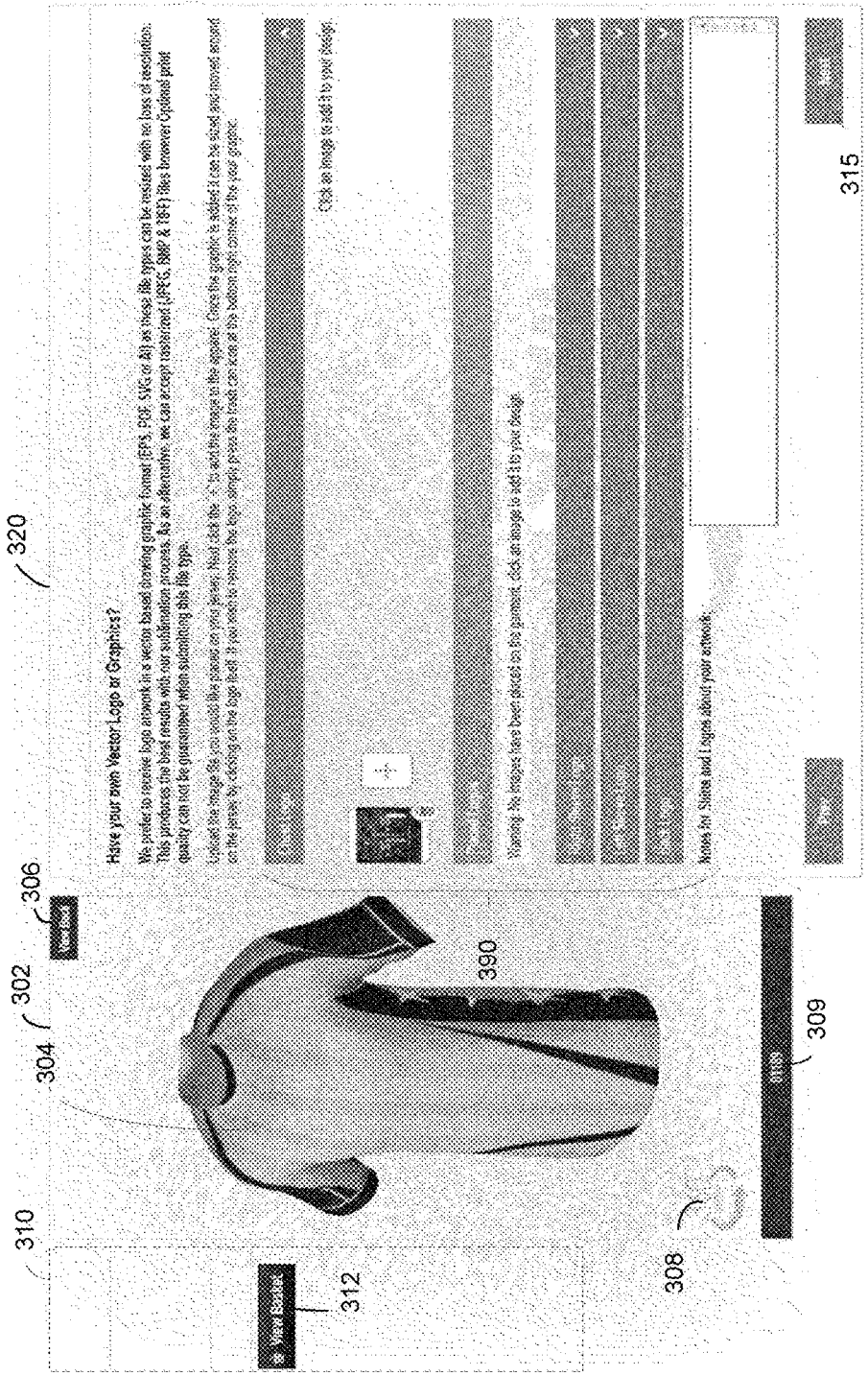

Referring now to FIG. 3G, the design navigator control 320 is configured to expand at the logo images bookmark collection 390, which allows the user 101 to upload or provide links to image files, vector files, etc. for the logo graphics for any of the chest logo, left sleeve logo, right sleeve logo, and back logo. In some embodiments, the logo can be placed in another location not restricted to the above. The information provided using the controls herein can be included in the order specification 152.

Figure 3H:
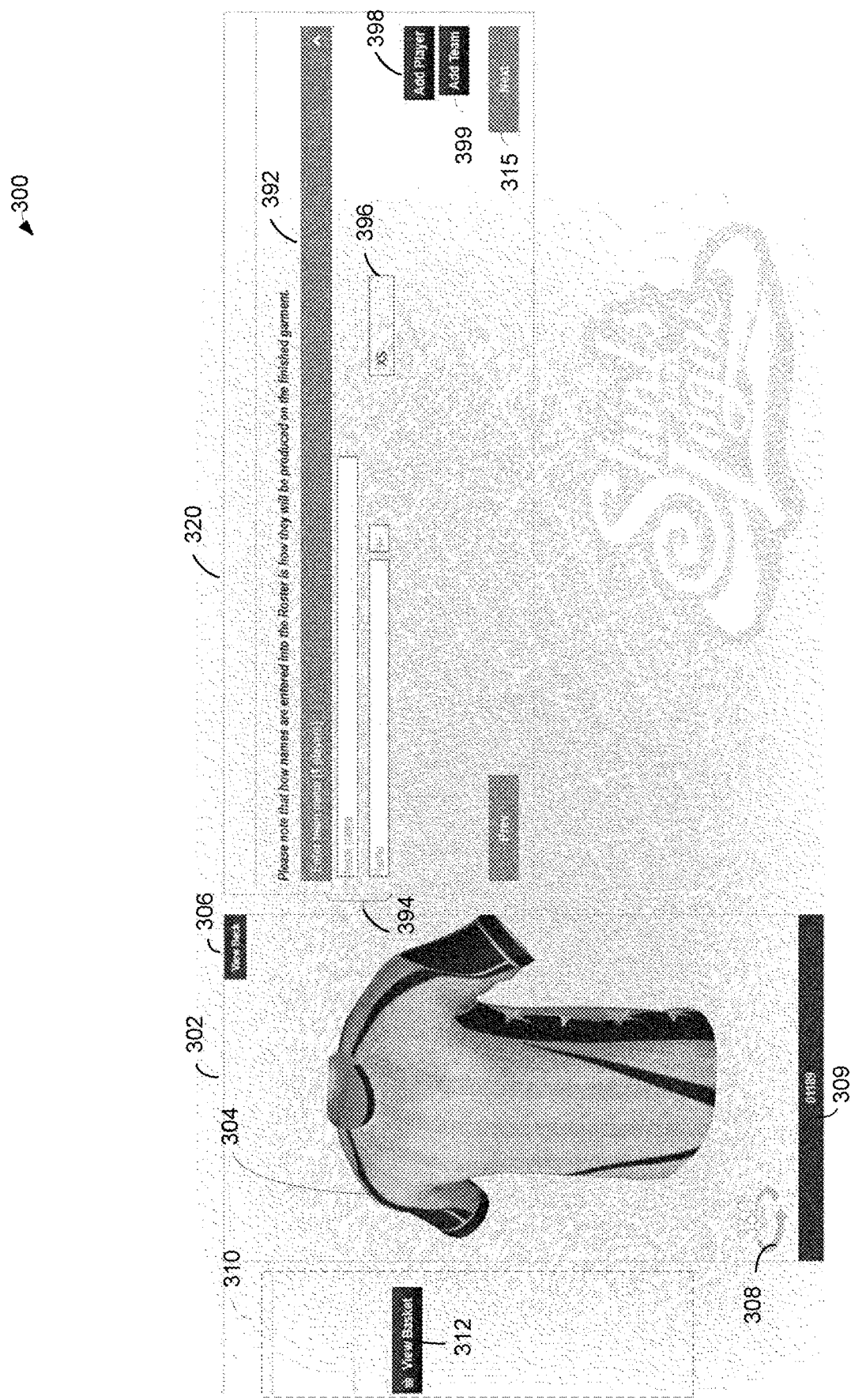

Referring now to FIG. 3H, the design navigator control 320 is configured to expand at the additional controls bookmark 392, which allows the user 101 to provide the team name 394, the size 396, etc. This information can be provided for a plurality of players using the add player control 398 and the add team control 399. The information provided using the controls herein can be included in the order specification 152.

Figure 4:
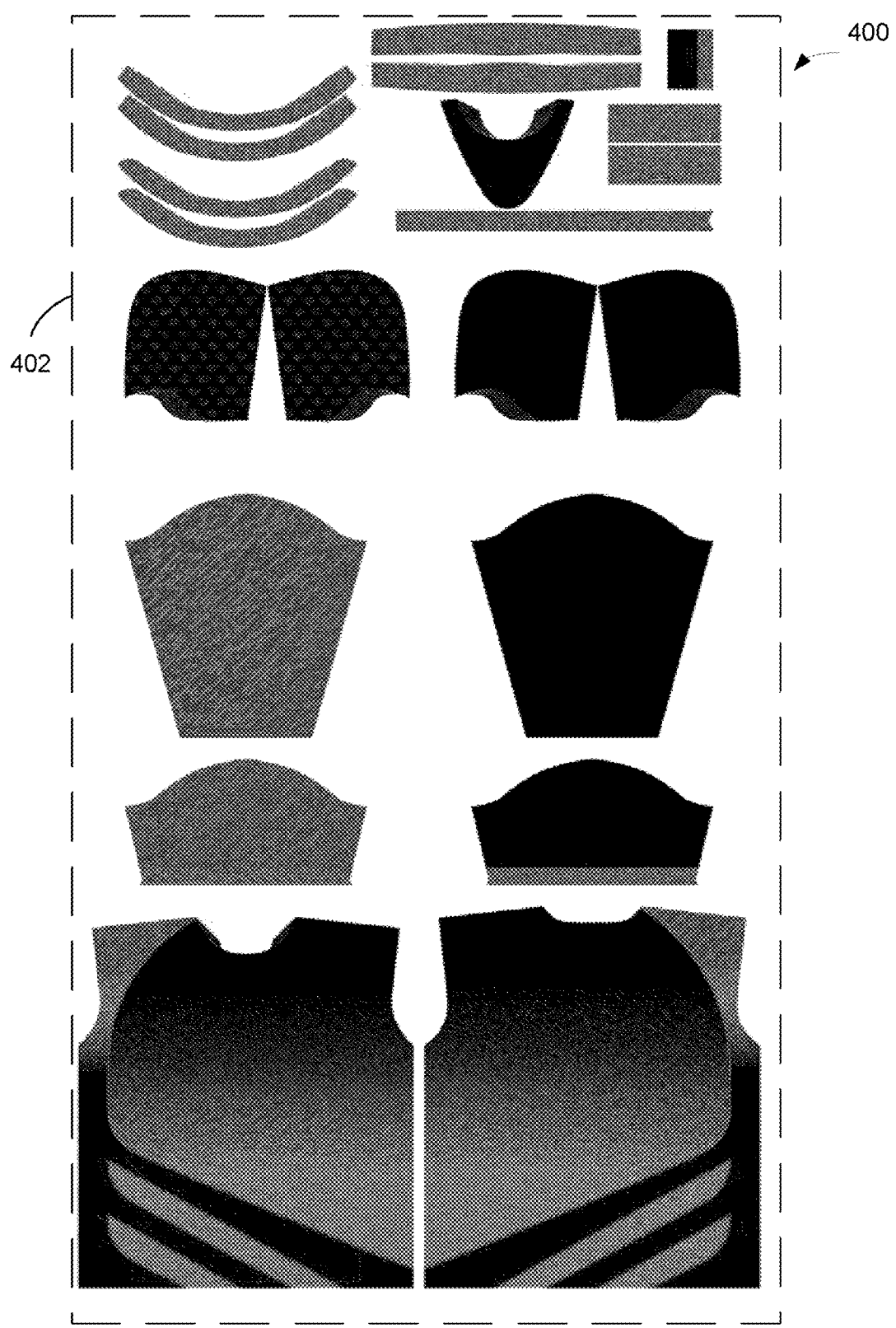
FIG. 4 is an example graphical user interface associated with a component specification engine of the computer-based control system for apparel manufacturing, wherein the component specification engine is provided to a designer through a designer computing device via a display thereof.

FIG. 4 is an example graphical user interface 400, which can be provided to the designer 103 through a display of the designer computing device 106. The interface 400 can enable the computer-based control system 102 to gather the data from the designer 103 needed to generate a design specification for a particular item, such as an item of apparel associated with the apparel identifier 399 of FIGS. 3A-3H. The interface 400 can be rendered as application forms, a series of applets, a series of pages in a web browser, etc.

Generally, the interface 400 can include controls 402 for capturing any information required to build the apparel specifications 154, such as cut, fabric type (e.g., cotton, polyester, silk, etc.), other material type (e.g., leather, rubber, polyvinyl, etc.), fabric properties (e.g., thickness, thread count, etc.), dimensions and location for custom item placement (logo, embroidery, etc.), resolution (e.g., the minimum pixel density value) and seam allowance supported for custom items, such as images, and the like.

In some embodiments, the interface 400 can be used to update any of the information associated with extended design specifications, such as information residing in the master pattern vault 130, layer definition vault 132, and/or setup settings vault 134. As shown, the controls 402 include various cutout templates, such as a sleeve cutout template, a front panel cutout template, a back panel cutout template, a collar cutout template, etc.

Figure 5A:
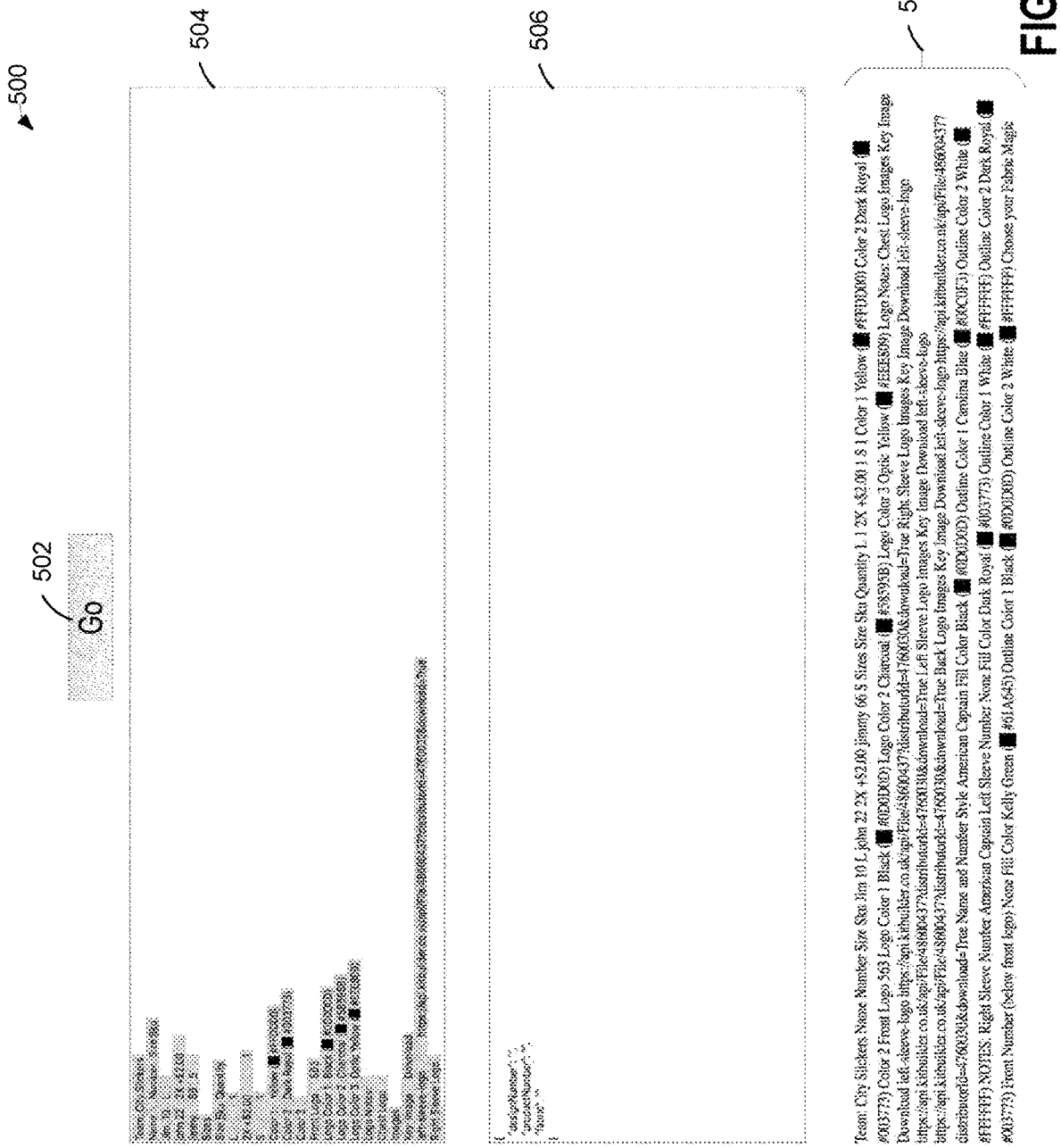
FIG. 5A is an example interface for generating an order specification based on user input provided using the design specification engine via the interface(s) of FIGS. 3A-3H.

FIG. 5A is an example interface 500 for generating an order specification based on user input provided using the design specification engine 118 via the interface(s) of FIGS. 3A-3H. As shown, the interface 500 is an HTML processor. For example, the user inputs of FIGS. 3A-3H can be captured by the design specification engine 118 of the customer computing device 104 using HTML code 504, which may be supplemented by function calls (e.g., JavaScript function calls 506). Upon detecting user interaction with the go button 502, the digital design engine 138 and/or the design specification engine 118 may generate, based on the data encoded using HTML code 504, the order specification 152 using the functions 506. The order specification 152 can be a text file and/or an electronic message that includes data labels and data values in a format decodable by the digital design engine 138 through the web service node 139 (e.g., JSON, REST, SOAP, XML RPC, etc.).

Figure 5B:
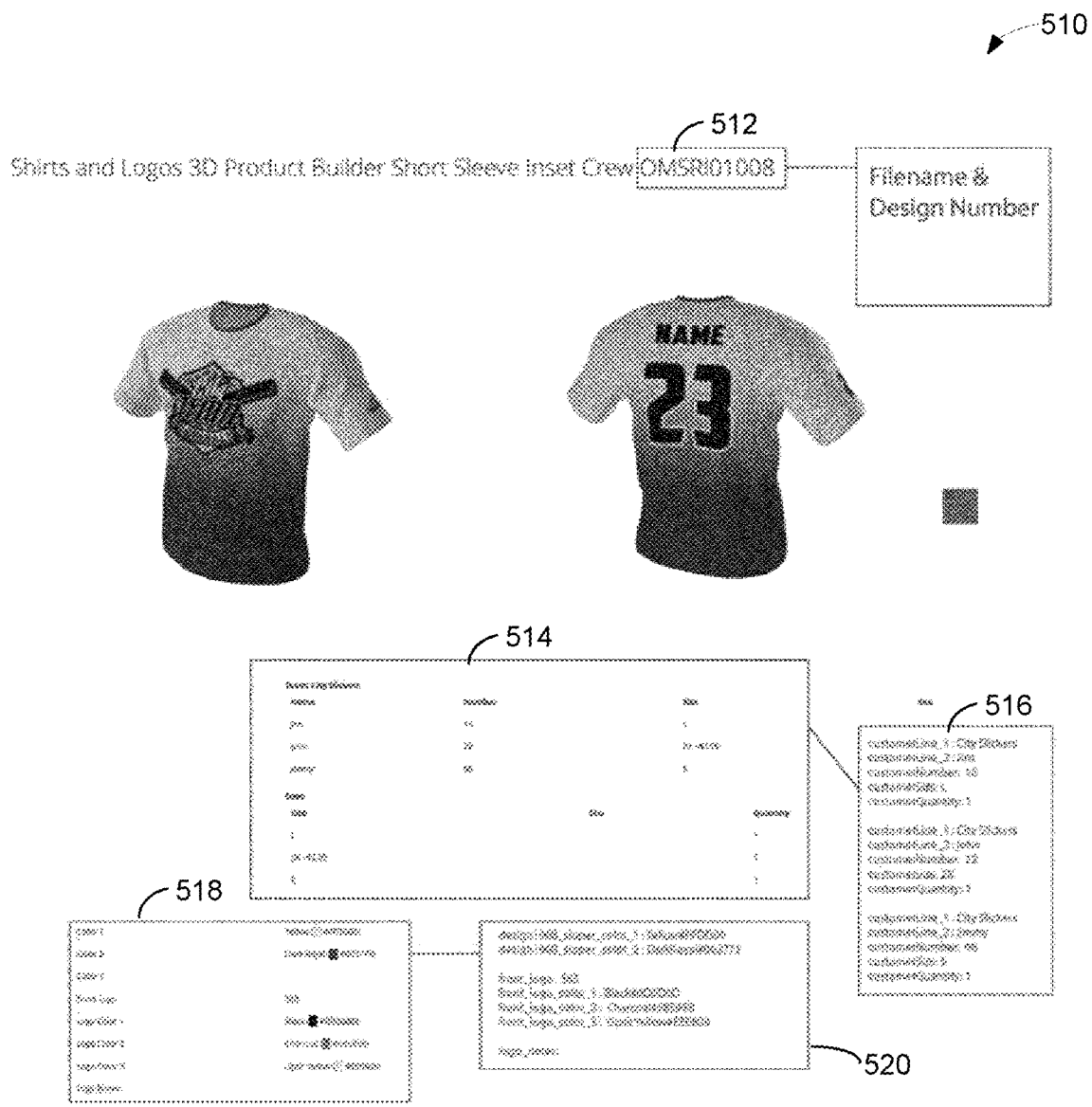
FIGS. 5B-5D are example order specification definitions for an order builder circuit of the digital design engine.
Figure 5C:
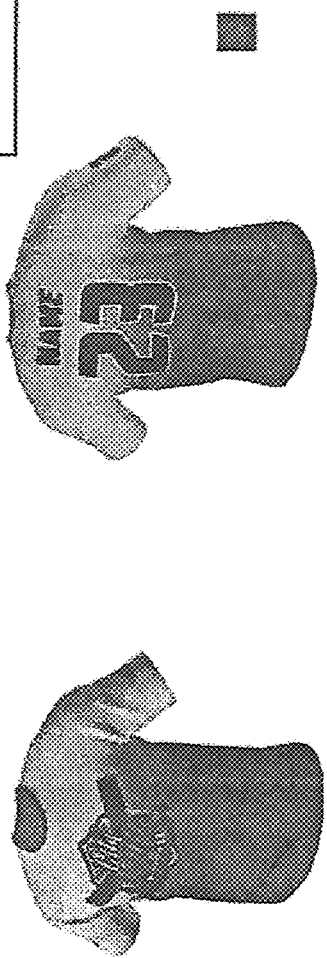
Figure 5D:
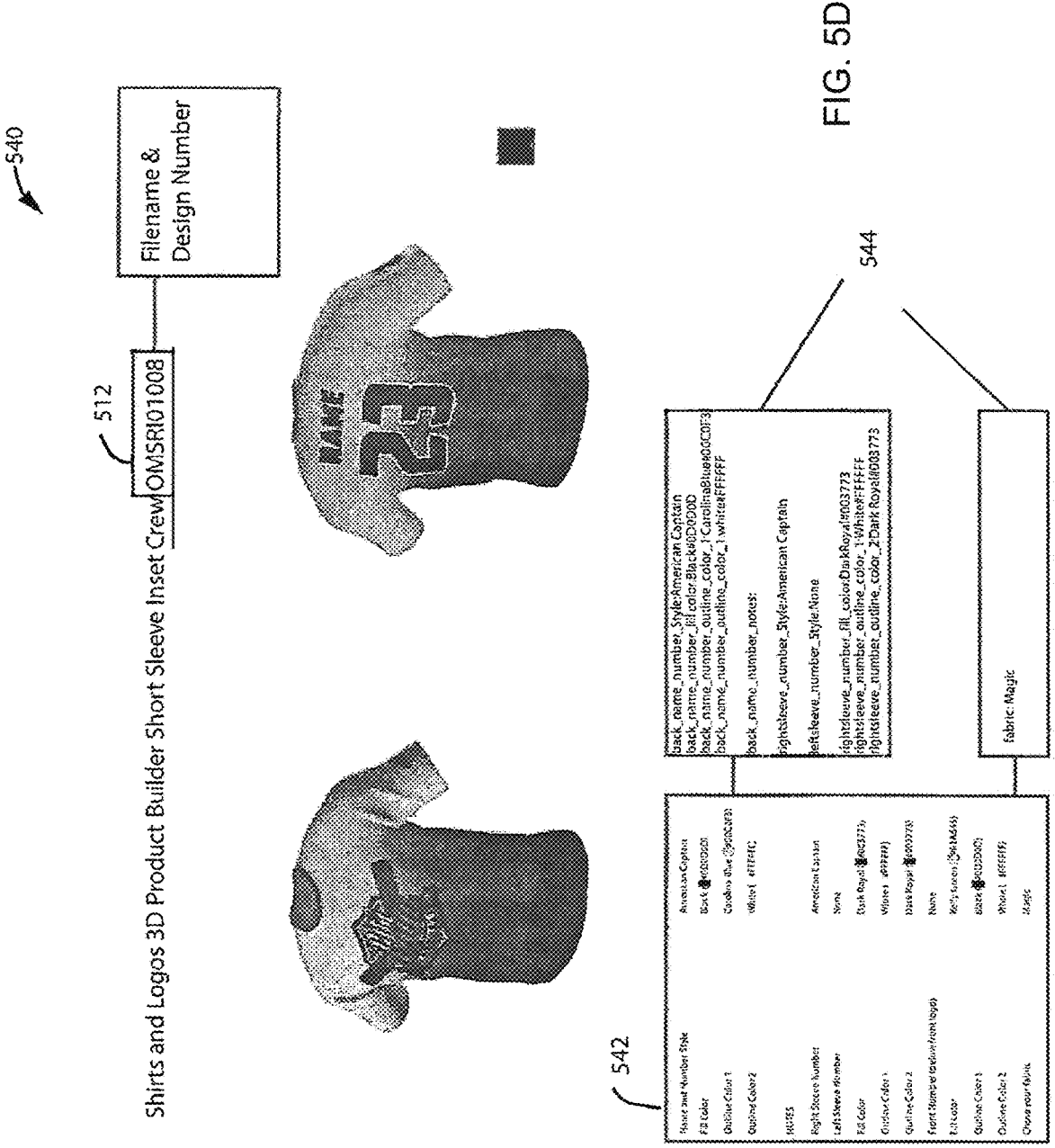

FIGS. 5B-5D are example order specification definitions 510, 530, and 540 for the order builder circuit 142 of the digital design engine 138 of FIG. 1. As shown, each of the example order specification definitions 510, 530, and 540 includes common elements, such as the order identifier 512. In some embodiments, the order identifier 512 can include references to an article identifier, job specification, etc.

As shown, the example order specification definitions 510, 530, and 540 provide visual illustrations of how the data collected using example interfaces of FIGS. 3A-3H maps to various components of an example order specification 152. Referring to FIG. 5B, the team information 514 is mapped to the team information definition segment 516 of the order specification 152. The color and logo information 518 is mapped to the color and logo definition segment 520 of the order specification 152. Referring to FIG. 5C, the logo image information 532 is mapped to the logo image definition segment 534 of the order specification 152. Referring to FIG. 5D, additional specifications 542 are mapped to the additional specifications segment 544 of the order specification 152. As shown, the additional specifications include the name and number style definitions.

FIG. 6 shows an example order specification 152 comprising multiple segments 602-614. The segments are populated with data entered by the user 101 via the customer computing device 104 using any of the interfaces shown in FIGS. 3A-3H. The example segments are shown in FIGS. 5B-5D. The order specification 152 can be a text file and/or an electronic message that includes data labels and data values in a format decodable by the digital design engine 138 through the web service node 139 (e.g., JSON, REST, SOAP, XML RPC, etc.).

FIG. 7 shows an example apparel specification layout 700 with markers for custom image placement. The apparel specification layout 700 includes various components of an article of apparel, such as cutout templates 710 (sleeves of an example shirt) and 730 (front and back panels of an example shirt.) The markers 720, 740, 750 and 760 denote example locations for custom images, such as logos, which can be provided by the user 101 as part of and order or selected by the user 101 from a library maintained by the computer-based control system 102, such as the image vault 136. One of ordinary skill in the art will appreciate that custom imagery markers can be placed in locations other than those shown in FIG. 7, depending on the type of the article of apparel, design requirements, customer preferences, etc.

Figure 8:
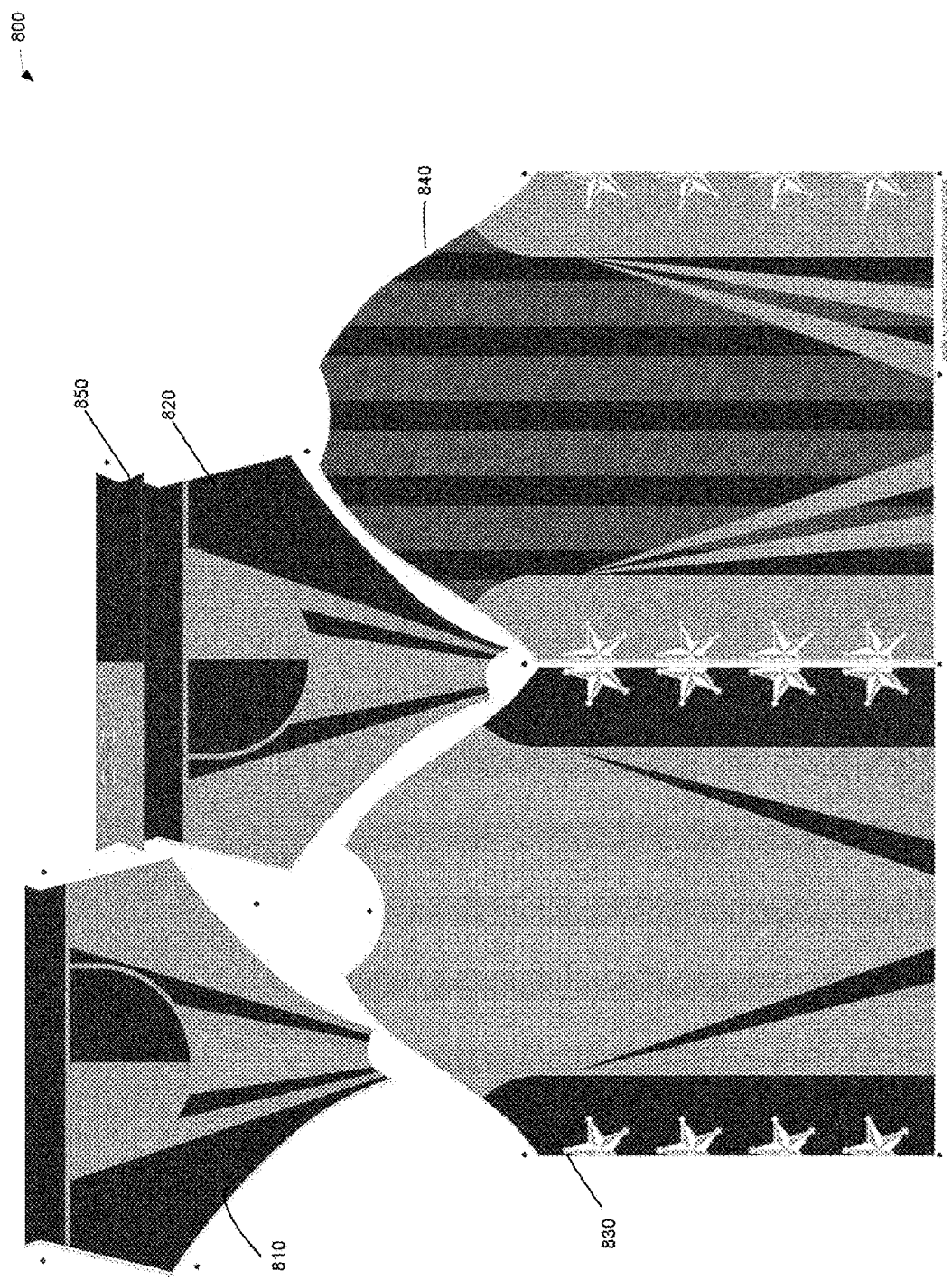
FIG. 8 shows an example graphical representation of a job specification comprising cutting instructions.

FIG. 8 shows an example graphical representation of a job specification 800 comprising cutting instructions. The example article of apparel shown is a raglan-sleeved shirt, but other articles of apparel can be produced in a similar fashion. As shown, the example job specification 800 includes cutting instructions shown in the form of template cutouts for various components of the example article of apparel. As shown, the dots on the cut file are registration marks. In some embodiments, a thin line around the outside of each piece can be added, denoting the cut lines. The cut lines may correspond to fit (athletic, slim, etc.). Here, example template cutouts include templates for sleeves 810 and 820, front panel 830, back panel 840, and collar 850. As shown, all or some of the template cutout instructions can comprise multiple colors, which can be customized by the user 101 using, for example, the interface shown in FIG. 3A. In some embodiments, any of the template cutout instructions can be augmented with markers for custom item placement, such as logos, personalization information (team name(s), logo positioning, team member numbers, etc.), and the like.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed:

1. A computer-based control system for apparel manufacturing, the computer-based control system comprising at least one processor, a network interface circuit, and a digital design engine, the computer-based control system structured to:

receive an order specification including one or more design specifications for one or more items of apparel via use of one or more files from which order information and/or sizing parameters specific to the apparel are defined, and receiving an apparel specification instruction involving design and technical details required to manufacture the one or more items of apparel, the order specification including at least graphic information;

generate an extended apparel specification involving a library of data and instructions further configurable to produce the one or more items of apparel;

link, by an order builder circuit of the digital design engine, at least one order item from the order specification and at least one apparel specification from the apparel specification instruction such that at least one parameter in the extended apparel specification is set based thereon, comprising:

using the at least one apparel specification, obtain the extended apparel specification from an apparel specification data source; and set at least one parameter in the extended apparel specification based on the at least one order item, the at least one order item based on the one or more design specifications;

generate, by a job specification circuit of the digital design engine, a job specification based on the extended apparel specification; and control, by the digital design engine, an apparel printer in manufacturing apparel according to the job specification by sending the job specification to the apparel printer for newly creating a garment from base components thereof including fabric and/or other material types in accordance with setup and process details.

2. The system of claim 1, wherein the order specification comprises at least one of invoice number, order date, delivery date, requested fabric type, design color options, a logo image, personalization information, size, and quantity.

3. The system of claim 1, wherein the job specification comprises one of a print file comprising printing instruction and a cut file comprising cutting instructions.

4. The system of claim 1, wherein the at least one processor is further configured to:

responsive to detecting user input on a customer computing device, generate, by a design specification engine communicatively coupled via the network interface circuit to the digital design engine, the order specification; and instruct the customer computing device to transmit, via the network interface circuit, the order specification to the digital design engine.

5. The system of claim 1, wherein generate an extended apparel specification comprises:

provide an interface specifying parameters for the apparel specification instruction;

instruct a designer computing device to provide the apparel specification instruction to the digital design engine, wherein the apparel specification instruction is structured to be decodable by the interface;

decode the apparel specification instruction, composing extract from the apparel specification instruction at least one of: a size instruction, a cut instruction, a fabric type instruction, other material type, a fabric properties instruction, a custom item placement instruction, sloper information, seam allowance, and a printer configuration instruction;

extract a digital image resource from one of the order specification, an apparel specification instruction, and an image vault associated with the apparel specification; and associate the apparel specification instruction with at least one extended apparel specification stored in a data vault of the computer-based control system, comprising update the extended apparel specification based on decoded apparel specification instruction.

6. The system of claim 5, wherein the digital design engine is communicatively coupled to a web service node, wherein the interface is a callable function interface specifying parameters for the apparel specification instruction, and wherein the apparel specification instruction is a web service message decodable by the interface.

7. The system of claim 6, wherein the apparel specification instruction is one of a JSON file, a REST message, a SOAP message, and an XML RPC file.

8. The system of claim 5, wherein the image resource comprises a copy of a digital image.

9. The system of claim 5, wherein the image resource comprises a link to a digital image.

10. The system of claim 5, wherein the processor is further configured to verify that the image resource is associated with a digital image having a resolution above a pre-determined threshold.

11. The system of claim 5, wherein the data vault is a master pattern vault and the extended apparel specification comprises at least one of fabric specification, sleeve cutout template, front panel cutout template, back panel cutout template, collar cutout template, sloper information, seam allowance, pattern information, and pattern fill information.

12. The system of claim 5, wherein the data vault is a layer definition vault and the extended apparel specification comprises at least one of background definition, a master artwork file, an image box, and a text box.

13. The system of claim 5, wherein the data vault is a setup settings vault and the extended apparel specification comprises at least one of printer identifier, printer specifications, monitored file system directory path, and job priority.

14. The system of claim 13, wherein printer specifications comprise a printing method.

15. The system of claim 14, wherein the printing method is sublimation.

16. The system of claim 14, wherein the printing method is direct-to-garment transfer.

17. The system of claim 1, wherein the at least one processor is further configured to:

parse at least one of the order specification and the apparel specification instruction to locate a pre-determined separator;

based on the pre-determined separator, identify a segment in the at least one of the order specification and the apparel specification; and set at least one parameter in the extended apparel specification based on a value of the segment.

18. The system of claim 1, wherein the at least one processor is further configured to: determine a start point and an end point of a segment in the at least one of the order specification and the apparel specification instruction;

based on the start point and the end point, extract the segment, wherein the segment corresponds to the at least one order item or the at least one apparel specification, and set at least one parameter in the extended apparel specification based on a value of the segment.

19. The system of claim 1, further comprising a web service node communicatively coupled to the digital design engine, wherein at least one of the order specification and the apparel specification instruction is transmitted to the digital design engine, via the web service node, as a web service message decodable by the digital design engine.

20. The system of claim 1, wherein the at least one of the order specification and the apparel specification instruction is transmitted to the digital design engine as one of a JSON file, a REST message, a SOAP message, and an XML RPC file.

21. The system of claim 1, wherein the at least one processor is further configured to:
- transmit, by the job specification circuit, the job specification to a monitored file system directory;
- periodically conduct an inventory of items in the monitored file system directory;
- upon detecting a new job specification in the monitored file system directory, generate, by the job specification circuit, a job request, and
- transmit the job request to a print queue associated with the computer-based control system.

22. The system of claim 1, wherein the order specification is a first order specification, and wherein the at least one processor is further configured to:
- receive a second order specification;
- aggregate the first order specification and the second order specification into a plurality of order specification items; and
- index each of the plurality of order specification item using at least one of invoice number, order date, delivery date, and requested fabric type.

23. The system of claim 1, wherein the processor is further configured to:
- parse the order specification to identify at least one image; and
- include the at least one image in the job specification.

24. The system of claim 1, wherein the job specification includes instructions for manufacturing at least one of an item of apparel, an accessory, and a consumer household item.

25. The system of claim 1, wherein the processor is further configured to:
- control, by the digital design engine, cutting equipment in manufacturing the apparel according to the job specification by sending the job specification to the cutting equipment, wherein printing of apparel by the apparel printer and cutting of apparel by the cutting equipment are defined via the job specification when generated.

26. The system of claim 1, wherein the at least one order item from the order specification and the at least one apparel specification instruction fill in gaps of the extended apparel specification for providing the job specification.

* * * * *